United States Patent
Shi et al.

(10) Patent No.: US 12,107,782 B2
(45) Date of Patent: Oct. 1, 2024

(54) METHOD AND DEVICE FOR DETERMINING REFERENCE SIGNAL, METHOD AND DEVICE FOR DETERMINING CONTROL CHANNEL UNIT, AND STORAGE MEDIUM

(71) Applicant: ZTE CORPORATION, Shenzhen (CN)

(72) Inventors: Jing Shi, Shenzhen (CN); Shuqiang Xia, Shenzhen (CN); Wen Zhang, Shenzhen (CN); Chunli Liang, Shenzhen (CN); Xianghui Han, Shenzhen (CN); Min Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 129 days.

(21) Appl. No.: 16/753,376

(22) PCT Filed: Oct. 31, 2018

(86) PCT No.: PCT/CN2018/113117
§ 371 (c)(1),
(2) Date: Apr. 3, 2020

(87) PCT Pub. No.: WO2019/085953
PCT Pub. Date: May 9, 2019

(65) Prior Publication Data
US 2020/0336268 A1    Oct. 22, 2020

(30) Foreign Application Priority Data
Oct. 31, 2017  (CN) .......................... 201711050997.1

(51) Int. Cl.
*H04L 5/00* (2006.01)
*H04L 5/10* (2006.01)
(Continued)

(52) U.S. Cl.
CPC .......... *H04L 5/0048* (2013.01); *H04L 5/0051* (2013.01); *H04L 5/0082* (2013.01);
(Continued)

(58) Field of Classification Search
CPC ....... H04L 5/0082; H04L 5/0051; H04L 5/10; H04L 27/2613; H04L 1/1854;
(Continued)

(56) References Cited

U.S. PATENT DOCUMENTS 10,397,946 B2 *  8/2019  Lee ..................... H04L 27/2613
10,771,224 B2 *  9/2020  Gao .................. H04W 72/0453
(Continued)

FOREIGN PATENT DOCUMENTS

CN    104769871 A    7/2015
CN    104919879 A    9/2015
(Continued)

OTHER PUBLICATIONS

International Search Report and Written Opinion Form PCT/ISA/210 and PCT/ISA237, International Application No. PCT/CN2018/113117, pp. 1-8, International Filing Date Oct. 31, 2018, mailing date of search report Feb. 2, 2019.
(Continued)

*Primary Examiner* — Harry H Kim
*Assistant Examiner* — Mohammed M Murshid
(74) *Attorney, Agent, or Firm* — BOND, SCHOENECK & KING, PLLC; George R. McGuire

(57) ABSTRACT

Provided are a method and device for determining a reference signal, a method and device for determining a control channel element, and a storage medium. The method for determining a reference signal includes: indicating, in a preset manner, that the reference signal exists in at least one of N scheduled transmission time intervals, where N is a positive integer.

16 Claims, 6 Drawing Sheets

Select part of N REGs to constitute a CCE in at least one of the following manners:
for a PDCCH based on a DMRS, when a mapping between the CCE and the REGs is a distributed mapping, the following principle is at least satisfied: a group of M REGs at equal intervals or discrete intervals in frequency domain constitute the CCE; or
for a PDCCH based on a cell reference signal, when a mapping between the CCE and the REGs is a distributed mapping, the following principle is at least satisfied: in a single symbol a group of REGs at equal intervals or discrete intervals in frequency domain constitute the CCE

~ S302

(51) Int. Cl.
*H04L 27/26* (2006.01)
*H04W 72/50* (2023.01)

(52) U.S. Cl.
CPC .............. *H04L 5/10* (2013.01); *H04L 27/261* (2013.01); *H04L 27/2613* (2013.01); *H04W 72/535* (2023.01); *H04L 27/26136* (2021.01)

(58) Field of Classification Search
CPC ... H04L 27/261; H04L 5/0007; H04L 5/0092; H04L 5/0048; H04L 5/0055; H04L 1/1607; H04W 72/1257; H04W 72/042
See application file for complete search history.

(56) References Cited

U.S. PATENT DOCUMENTS

| | | | | |
|---|---|---|---|---|
| 2014/0204888 | A1* | 7/2014 | Chung | H04L 5/0053 370/329 |
| 2018/0160445 | A1* | 6/2018 | Babaei | H04W 72/044 |
| 2018/0184443 | A1* | 6/2018 | Li | H04W 72/23 |
| 2018/0234213 | A1* | 8/2018 | Han | H04L 1/1607 |
| 2018/0270794 | A1* | 9/2018 | Tiirola | H04L 5/0051 |
| 2018/0376495 | A1* | 12/2018 | Lee | H04W 72/04 |
| 2019/0007176 | A1* | 1/2019 | Ozturk | H04W 72/1268 |
| 2019/0082454 | A1* | 3/2019 | Shi | H04W 72/20 |
| 2019/0116007 | A1* | 4/2019 | Yi | H04W 72/0453 |
| 2019/0141555 | A1* | 5/2019 | Tooher | H04W 24/10 |
| 2019/0166616 | A1* | 5/2019 | Liu | H04L 5/0007 |
| 2019/0327760 | A1* | 10/2019 | Holfeld | H04W 72/23 |
| 2019/0373560 | A1* | 12/2019 | Ouchi | H04W 72/23 |
| 2020/0068596 | A1* | 2/2020 | Zhang | H04L 5/0007 |
| 2020/0163060 | A1* | 5/2020 | Yoshimura | H04W 72/23 |
| 2020/0163103 | A1* | 5/2020 | Kuang | H04W 72/23 |
| 2020/0178232 | A1* | 6/2020 | Li | H04L 5/0053 |
| 2020/0295909 | A1* | 9/2020 | Liu | H04W 72/23 |
| 2020/0305129 | A1* | 9/2020 | Lee | H04L 1/1861 |
| 2021/0105088 | A1* | 4/2021 | Shimezawa | H04W 76/27 |
| 2021/0218515 | A1* | 7/2021 | Yi | H04W 72/21 |
| 2023/0239894 | A1* | 7/2023 | Liu | H04W 72/23 370/330 |

FOREIGN PATENT DOCUMENTS

| | | | |
|---|---|---|---|
| CN | 106465391 A | 2/2017 | |
| CN | 107154911 A | 9/2017 | |
| WO | 2017052706 A1 | 3/2017 | |
| WO | 2017056020 A1 | 4/2017 | |
| WO | WO 2018/227478 | * 6/2017 | ............ H04W 72/04 |

OTHER PUBLICATIONS

CMCC: "Discussion on DMRS sharing for uplink sTTI Transmission" 3GPP TSG RAN WGI Meeting #88b Spokane, USA Apr. 3-7, 2017, pp. 1-3.
"6 Downlink" 3GPP Draft; R1-1718316 CR 36.211, Oct. 8, 2017 pp. 1-74.

* cited by examiner

```
┌─────────────────────────────────────────────────┐
│ Indicate, in a preset manner, that a reference  │
│ signal exists in at least one of N scheduled    │─── S102
│ TTIs                                            │
└─────────────────────────────────────────────────┘
```

FIG. 1

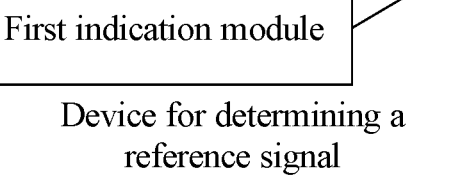

Device for determining a reference signal

FIG. 2

```
┌─────────────────────────────────────────────────┐
│ Select part of N REGs to constitute a CCE in at │
│ least one of the following manners:             │
│ for a PDCCH based on a DMRS, when a mapping     │
│ between the CCE and the REGs is a distributed   │
│ mapping, the following principle is at least    │
│ satisfied: a group of M REGs at equal intervals │─── S302
│ or discrete intervals in frequency domain       │
│ constitute the CCE; or                          │
│ for a PDCCH based on a cell reference signal,   │
│ when a mapping between the CCE and the REGs is  │
│ a distributed mapping, the following principle  │
│ is at least satisfied: in a single symbol a     │
│ group of REGs at equal intervals or discrete    │
│ intervals in frequency domain constitute the CCE│
└─────────────────────────────────────────────────┘
```

FIG. 3

Determine, in a preset manner, that a reference signal exists in at least one of each N TTIs in an SPS transmission — S902

METHOD AND DEVICE FOR DETERMINING REFERENCE SIGNAL, METHOD AND DEVICE FOR DETERMINING CONTROL CHANNEL UNIT, AND STORAGE MEDIUM

This is a National Stage Application, filed under 35 U.S.C. 371, of International Patent Application No. PCT/CN2018/113117, filed on Oct. 31, 2018, which claims priority to a Chinese patent application No. 201711050997.1 filed on Oct. 31, 2017, disclosures of which are incorporated herein by reference in their entireties.

TECHNICAL FIELD

The present application relates to the field of communications and, for example, to a method and device for determining a reference signal, a method and device for determining a control channel element, and a storage medium.

BACKGROUND

At present, the 4th Generation (4G) mobile communication technology Long-Term Evolution (LTE)/Long-Term Evolution (LTE)/Long-Term Evolution Advance (LTE-Advance/LTE-A) and the 5th Generation (5G) mobile communication technology are facing increasing requirements. From the current development trend, both 4G and 5G systems are studying how to support the characteristics of enhanced mobile broadband (eMBB), ultra-reliable and low-latency communication (URLLC), and massive connections. To support the characteristics of the URLLC, it is necessary to transmit URLLC traffic with short transmission time intervals. Meanwhile, to meet a high-reliability requirement or to transmit a large data packet under a specified latency requirement, it is necessary to support the scheduling of multiple short transmission time intervals. Multi-subframe scheduling has been supported in the LTE/LTE-A system, and this mechanism may be used for the scheduling of multiple short transmission time intervals. However, if reference information is transmitted in each of the multiple short transmission time intervals scheduled, compared with the multi-subframe scheduling, a resource utilization rate is reduced and thus reference signal overheads need to be reduced, while the reference signal overheads are not considered to be reduced in the conventional subframe scheduling process.

No effective solution has been proposed for the problem in the related art of large reference signal overheads because a reference signal is transmitted in each short transmission time interval.

SUMMARY

Embodiments of the present application provide a method and device for determining a reference signal, a method and device for determining a control channel element, and a storage medium, to solve at least the problem in the related art of large reference signal overheads because a reference signal is transmitted in each short transmission time interval.

An embodiment of the present application provides a method for determining a reference signal. The method includes a step described below.

It is indicated, in a preset manner, that the reference signal exists in at least one of N scheduled transmission time intervals (TTIs), where N is a positive integer.

Another embodiment of the present application further provides a method for determining a semi-persistent scheduling (SPS) transmission time. The method includes steps described below.

An SPS period, an offset value, and a transmission time interval (TTI) length are indicated via high-layer signaling, where the TTI length is jointly encoded with the SPS period and the offset value; or an SPS period and an offset value are indicated via high-layer signaling, where physical layer signaling for activating an SPS transmission is at a limited transmission time; or an SPS period is notified via high-layer signaling, where physical layer signaling for activating an SPS transmission is at a limited transmission time, and an offset value and a TTI length are jointly encoded and indicated.

The SPS transmission time is determined according to one of followings which are obtained through an indication: the SPS period, the offset value, and the TTI length; the SPS period and the offset value; or the offset value and the TTI length.

Another embodiment of the present application further provides a method for determining a control channel element (CCE). The method includes a step described below.

Part of N resource element groups (REGs) are selected to constitute the CCE in at least one of manners described below.

For a physical downlink control channel (PDCCH) based on a demodulation reference signal (DMRS), when a mapping between the CCE and the REGs is a distributed mapping, a following principle is at least satisfied: a group of M REGs at equal intervals or discrete intervals in frequency domain constitute the CCE, where M is a number of REGs included in K resource blocks (RBs) in a transmission time interval (TTI), and K and N are both positive integers.

For a PDCCH based on a cell reference signal, when a mapping between the CCE and the REGs is a distributed mapping, a following principle is at least satisfied: in a single symbol a group of REGs at equal intervals or discrete intervals in frequency domain constitute the CCE.

Another embodiment of the present application further provides a device for determining a reference signal. The device includes a first indication module.

The first indication module is configured to indicate, in a preset manner, that the reference signal exists in at least one of N scheduled transmission time intervals (TTIs), where N is a positive integer.

Another embodiment of the present application further provides a device for determining a control channel element (CCE). The device includes a selection module.

The selection module is configured to select part of N resource element groups (REGs) to constitute the CCE in at least one of manners described below.

For a physical downlink control channel (PDCCH) based on a demodulation reference signal (DMRS), when a mapping between the CCE and the REGs is a distributed mapping, a following principle is at least satisfied: a group of M REGs at equal intervals or discrete intervals in frequency domain constitute the CCE, where M is a number of REGs included in K resource blocks (RBs) in a transmission time interval (TTI), and K and N are both positive integers.

For a PDCCH based on a cell reference signal, when a mapping between the CCE and the REGs is a distributed mapping, a following principle is at least satisfied: in a single symbol a group of REGs at equal intervals or discrete intervals in frequency domain constitute the CCE.

Another embodiment of the present application further provides a device for determining a reference signal. The device includes a first determining module.

The first determining module is configured to determine, in a preset manner, that the reference signal exists in at least one of each N transmission time intervals (TTIs) in a semi-persistent scheduling (SPS) transmission, where N is a positive integer.

Another embodiment of the present application further provides a device for determining a semi-persistent scheduling (SPS) transmission time. The device includes an indication module and a second determining module.

The indication module is configured to jointly encode and indicate, via high-layer signaling, an SPS period, an offset value, and a transmission time interval (TTI) length; or indicate, via high-layer signaling, an SPS period and an offset value, where physical layer signaling for activating an SPS transmission is at a limited transmission time; or notify, via high-layer signaling, an SPS period, where physical layer signaling for activating an SPS transmission is at a limited transmission time, and an offset value and a TTI length are jointly encoded and indicated.

The second determining module is configured to determine the SPS transmission time according to one of followings which are obtained through an indication: the SPS period, the offset value, and the TTI length; the SPS period and the offset value; or the offset value and the TTI length.

Another embodiment of the present application further provides a storage medium. The storage medium includes stored programs which, when executed, perform the method for determining a reference signal or the method for determining a control channel element (CCE).

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings:

FIG. 1 is a flowchart of a method for determining a reference signal according to an embodiment of the present application;

FIG. 2 is a block diagram of a device for determining a reference signal according to an embodiment of the present application;

FIG. 3 is a flowchart of a method for determining a control channel element (CCE) according to an embodiment of the present application;

DETAILED DESCRIPTION

Figure 4:
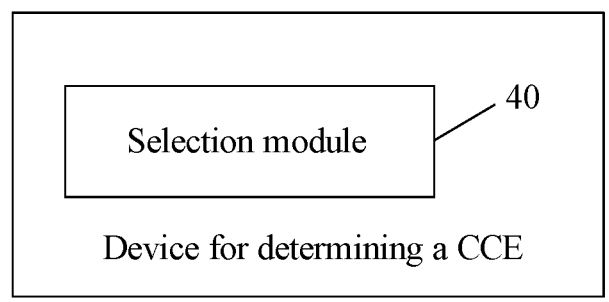
FIG. 4 is a block diagram of a device for determining a CCE according to an embodiment of the present application.

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment One

This embodiment provides a method for determining a reference signal. FIG. 1 is a flowchart of a method for determining a reference signal according to an embodiment of the present application. As shown in FIG. 1, the method includes step S102.

In step S102, it is indicated, in a preset manner, that the reference signal exists in at least one of N scheduled transmission time intervals (TTIs), where N is a positive integer.

In the present application, it may be indicated in the preset manner that the reference signal exists in at least one of the N scheduled TTIs, and then it may be indicated that the reference signal does not exist in each of the N TTIs, thereby solving the problem in the related art of large reference signal overheads because a reference signal is transmitted in each short TTI, and reducing the reference signal overheads.

Though it is limited in the embodiments of the present application that the reference signal exists in at least one of the N TTIs, to better solve the technical problem, it is indicated in the preset manner that the reference signal exists in at least one TTI which is less than or equal to the N TTIs.

In an embodiment, in response to determining that the reference signal has a fixed position in the N TTIs, the step of indicating, in the preset manner, that the reference signal exists in at least one of the N TTIs includes at least one of steps described below.

In a manner one, it is indicated that the reference signal exists in a first TTI and there is no reference signal in the rest of the N TTIs.

In a manner two, one TTI including the reference signal among the N scheduled TTIs is indicated.

In a manner three, it is indicated whether each of the N scheduled TTIs includes the reference signal.

In a manner four, at most K TTIs each including the reference signal, among the N scheduled TTIs, are indicated, where K is a positive integer less than N.

In a manner five, whether the reference signal is carried in the rest of the N scheduled TTIs except the first TTI and a position for carrying the reference signal are indicated, where the first TTI includes the reference signal, and whether another TTI includes the reference signal and a position of the another TTI including the reference signal are indicated.

In a manner six, a reference signal pattern in the N TTIs is indicated.

The reference signal pattern is a set of patterns for a number x of TTIs scheduled.

Alternatively, the reference signal pattern simultaneously carries information about a number of TTIs scheduled.

Alternatively, the reference signal pattern simultaneously carries timing information for an acknowledgement (ACK)/no acknowledgement (NACK) feedback.

It is to be noted that the preceding manners one to six may be applied to a downlink transmission process, and may also be applied to an uplink transmission process, which is not limited in the embodiments of the present application. The manners one to six are applied to a scenario where the reference signal has the fixed position in the TTIs.

In an embodiment, in response to determining that at least two of the N TTIs include reference signals, the reference signals are of the same type.

In an embodiment, in response to determining that at least two of the N TTIs include reference signals and at least two of the N TTIs are of different types, the reference signals are of the same type. In the embodiments of the present application, types of the TTIs are different subframe types, such as a Multicast/Broadcast Single Frequency Network (MBSFN) subframe and a non-MBSFN subframe; or the types of the TTIs are different slot types, such as a pure downlink slot, a pure uplink slot and a slot including a downlink portion, a reserved portion and an uplink portion.

In an embodiment, the manner five is implemented in one of manners described below.

A position of one TTI, which includes the reference signal, of the rest TTIs except the first TTI among the N TTIs is indicated.

One bit is used for indicating, among the N TTIs, whether there is the reference signal included in another TTI except the first TTI. In response to determining that another TTI includes the reference signal, the another TTI is fixed at a last TTI among the N scheduled TTIs. In an embodiment, a physical downlink shared channel (PDSCH), which may also be understood as a short PDSCH (sPDSCH), is supported to use a resource unused by a physical downlink control channel (PDCCH) which may also be understood as a short PDCCH (sPDCCH) in at least one of cases described below.

Among the N TTIs, only the first TTI supports the PDSCH to use the resource unused by the PDCCH.

In a case where N>1, the PDSCH is not supported to use the resource unused by the PDCCH.

In a case where N=1, the PDSCH is supported to use the resource unused by the PDCCH.

Among the N TTIs, the N TTIs reuse the same resource unused by the PDCCH with the first TTI.

In an embodiment, a timing of the ACK/NACK feedback for data carried in the N TTIs is determined according to a position of the reference signal in at least one of manners described below.

In a manner one, in response to determining that only one of a plurality of TTIs includes the reference signal, a timing of the ACK/NACK feedback in a case where the first TTI includes the reference signal is k1, a timing of the ACK/NACK feedback in a case where another one TTI except the first TTI includes the reference signal is k2, and k1<k2.

In a manner two, in response to determining that more than one of a plurality of TTIs includes the reference signal, a timing of the ACK/NACK feedback in a case where a last TTI includes the reference signal is k3, a timing of the ACK/NACK feedback in a case where the last TTI includes no reference signal is k4, and k3>k4.

In the preceding manners, k1, k2, k3 and k4 are all positive numbers.

In an embodiment, in response to determining that the reference signal has an unfixed position in the N TTIs, the step of indicating, in the preset manner, that the reference signal exists in at least one of the N TTIs includes at least one of steps described below.

In a manner one, a reference signal pattern of the first TTI among the N TTIs is indicated, where the reference signal pattern is consistent with a reference signal pattern in single TTI scheduling.

In a manner two, one of the N TTIs and a reference signal pattern of the one of the N TTIs are indicated, where the reference signal pattern is consistent with the reference signal pattern in the single TTI scheduling.

In a manner three, a reference signal pattern of at most K of the N TTIs is indicated, where the reference signal pattern is consistent with the reference signal pattern in the single TTI scheduling, and K is a positive integer less than N.

In a manner four, a reference signal pattern for each of the N TTIs is indicated, where the reference signal pattern is consistent with the reference signal pattern in the single TTI scheduling.

In a manner five, whether the reference signal is carried in the rest of the N scheduled TTIs except the first TTI and a position for carrying the reference signal are indicated, where the first TTI includes the reference signal, and whether another TTI includes the reference signal, a position of the another TTI including the reference signal, and a position of the reference signal in the TTI are indicated.

In a manner six, the reference signal pattern in the N TTIs is indicated. The reference signal pattern is the set of patterns for the number x of TTIs scheduled, or the reference signal pattern simultaneously carries the information about the number of TTIs scheduled, or the reference signal pattern simultaneously carries the timing information for the ACK/NACK feedback.

It is to be noted that the preceding manners one to six may be applied to the uplink transmission process, and may also be applied to the downlink transmission process, which is not limited in the embodiments of the present application. The manners one to six are applied to a scenario where the reference signal has the unfixed position in the TTIs.

In an embodiment, in response to determining that at least two of the N TTIs include the reference signals, the reference signals are of the same type.

In an embodiment, in response to determining that at least two of the N TTIs include the reference signals and the at least two of the N TTIs are of different types, the reference signals are of the same type. The types of the TTIs are different subframe types, such as the MBSFN subframe and the non-MBSFN subframe; or the types of the TTIs are different slot types, such as the pure downlink slot, the pure uplink slot and the slot including the downlink portion, the reserved portion and the uplink portion.

In an embodiment, the manner five is implemented in one of manners described below.

A position of one TTI, which includes the reference signal, of the rest TTIs except the first TTI among the N TTIs and the position of the reference signal in the one TTI are indicated.

Whether another TTI except the first TTI among the N TTIs includes the reference signal and the position of the reference signal in the TTI are indicated. For example, one bit is used for indicating whether another TTI except the first TTI among the N TTIs includes the reference signal and the position of the reference signal in the TTI.

In an embodiment, the method further includes a step described below.

In response to determining that another TTI includes the reference signal, the another TTI is fixed at the last TTI among the N scheduled TTIs.

From the description of the embodiments described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present application substantially, or the part contributing to the related art, may be embodied in the form of a software product. The software product is stored on a storage medium (such as a read-only memory (ROM)/random access memory (RAM), a magnetic disk or an optical disk) and includes several instructions for enabling a terminal apparatus (which may be a mobile phone, a computer, a server or a network apparatus) to execute the method according to multiple embodiments of the present application.

Embodiment Two

This embodiment further provides a device for determining a reference signal. The device is used for implementing the above-mentioned embodiments and application embodiments. What has been described will not be repeated. As used below, the term "module" may be at least one of software, hardware or a combination thereof capable of implementing predetermined functions. The device in the embodiments described below is preferably implemented by software, but implementation by hardware or by a combination of software and hardware is also possible and conceived.

FIG. 2 is a block diagram of a device for determining a reference signal according to an embodiment of the present application. As shown in FIG. 2, the device includes a first indication module 20.

The first indication module 20 is configured to indicate, in a preset manner, that the reference signal exists in at least one of N scheduled transmission time intervals (TTIs), where N is a positive integer.

In an optional embodiment, the first indication module 20 is configured to perform at least one of operations described below.

In response to determining that the reference signal has a fixed position in the N TTIs, it is indicated, in the preset manner, that the reference signal exists in at least one of the N TTIs in at least one of manners described below.

In a manner one, it is indicated that the reference signal exists in a first TTI and there is no reference signal in the rest of the N TTIs.

In a manner two, one TTI including the reference signal among the N scheduled TTIs is indicated.

In a manner three, it is indicated whether each of the N scheduled TTIs includes the reference signal.

In a manner four, at most K TTIs each including the reference signal, among the N scheduled TTIs, are indicated, where K is a positive integer less than N.

In a manner five, whether the reference signal is carried in the rest of the N scheduled TTIs except the first TTI and a position for carrying the reference signal are indicated, where the first TTI includes the reference signal, and whether another TTI includes the reference signal and a position of the another TTI including the reference signal are indicated.

In a manner six, a reference signal pattern in the N TTIs is indicated.

The reference signal pattern is a set of patterns for a number x of TTIs scheduled.

Alternatively, the reference signal pattern simultaneously carries information about a number of TTIs scheduled.

Alternatively, the reference signal pattern simultaneously carries timing information for an ACK/NACK feedback.

In an embodiment, in response to determining that at least two of the N TTIs include reference signals, the reference signals are of the same type.

In an embodiment, in response to determining that at least two of the N TTIs include reference signals and at least two of the N TTIs are of different types, the reference signals are of the same type. In the embodiments of the present application, types of the TTIs are different subframe types, such as an MBSFN subframe and a non-MBSFN subframe; or the types of the TTIs are different slot types, such as a pure downlink slot, a pure uplink slot and a slot including a downlink portion, a reserved portion and an uplink portion.

In an embodiment, the manner five is implemented in one of manners described below.

A position of one TTI, which includes the reference signal, of the rest TTIs except the first TTI among the N TTIs is indicated.

One bit is used for indicating, among the N TTIs, whether there is the reference signal included in another TTI except the first TTI. In response to determining that another TTI includes the reference signal, the another TTI is fixed at a last TTI among the N scheduled TTIs.

In an embodiment, in a downlink transmission process, a physical downlink shared channel (PDSCH), which may also be understood as a short PDSCH (sPDSCH), is supported to use a resource unused by a physical downlink control channel (PDCCH) which may also be understood as a short PDCCH (sPDCCH) in at least one of cases described below.

Among the N TTIs, only the first TTI supports the PDSCH to use the resource unused by the PDCCH.

In a case where N>1, the PDSCH is not supported to use the resource unused by the PDCCH.

In a case where N=1, the PDSCH is supported to use the resource unused by the PDCCH.

Among the N TTIs, the N TTIs reuse the same resource unused by the PDCCH with the first TTI.

In an embodiment, a timing of the ACK/NACK feedback for data carried in the N TTIs is determined according to a position of the reference signal in at least one of manners described below.

In a manner one, in response to determining that only one of a plurality of TTIs includes the reference signal, a timing of the ACK/NACK feedback in a case where the first TTI includes the reference signal is k1, a timing of the ACK/NACK feedback in a case where another one TTI except the first TTI includes the reference signal is k2, and k1<k2.

In a manner two, in response to determining that more than one of a plurality of TTIs includes the reference signal, a timing of the ACK/NACK feedback in a case where a last TTI includes the reference signal is k3, a timing of the ACK/NACK feedback in a case where the last TTI includes no reference signal is k4, and k3>k4.

In the preceding manners, k1, k2, k3 and k4 are all positive numbers.

In an embodiment, in response to determining that the reference signal has an unfixed position in the N TTIs, it is indicated, in the preset manner, that the reference signal exists in at least one of the N TTIs in at least one of manners described below.

In a manner one, a reference signal pattern of the first TTI among the N TTIs is indicated, where the reference signal pattern is consistent with a reference signal pattern in single TTI scheduling.

In a manner two, one of the N TTIs and a reference signal pattern of the one of the N TTIs are indicated, where the reference signal pattern is consistent with the reference signal pattern in the single TTI scheduling.

In a manner three, a reference signal pattern of at most K of the N TTIs is indicated, where the reference signal pattern is consistent with the reference signal pattern in the single TTI scheduling, and K is a positive integer less than N.

In a manner four, a reference signal pattern for each of the N TTIs is indicated, where the reference signal pattern is consistent with the reference signal pattern in the single TTI scheduling.

In a manner five, whether the reference signal is carried in the rest of the N scheduled TTIs except the first TTI and a position for carrying the reference signal are indicated, where the first TTI includes the reference signal, and whether another TTI includes the reference signal, a position of the another TTI including the reference signal, and a position of the reference signal in the TTI are indicated.

In a manner six, the reference signal pattern in the N TTIs is indicated. The reference signal pattern is the set of patterns for the number x of TTIs scheduled, or the reference signal pattern simultaneously carries the information about the number of TTIs scheduled, or the reference signal pattern simultaneously carries the timing information for the ACK/NACK feedback.

In an embodiment, in response to determining that at least two of the N TTIs include the reference signals, the reference signals are of the same type.

In an embodiment, in response to determining that at least two of the N TTIs include the reference signals and the at least two of the N TTIs are of different types, the reference signals are of the same type. The types of the TTIs are different subframe types, such as the MBSFN subframe and the non-MBSFN subframe; or the types of the TTIs are different slot types, such as the pure downlink slot, the pure uplink slot and the slot including the downlink portion, the reserved portion and the uplink portion.

In an embodiment, the manner five is implemented in one of manners described below.

A position of one TTI, which includes the reference signal, of the rest TTIs except the first TTI among the N TTIs and the position of the reference signal in the one TTI are indicated.

Whether another TTI except the first TTI among the N TTIs includes the reference signal and the position of the reference signal in the TTI are indicated.

In an embodiment, the method further includes: in response to determining that another TTI includes the reference signal, fixing the another TTI at the last TTI among the N scheduled TTIs.

It is to be noted that the preceding manners one to five may be applied to a downlink transmission process, and may also be applied to an uplink transmission process, which is not limited in the embodiments of the present application.

Embodiment Three

An embodiment of the present application further provides a method for determining a control channel element (CCE). FIG. 3 is a flowchart of a method for determining a CCE according to an embodiment of the present application. As shown in FIG. 3, the method includes step S302.

In step S302, part of N resource element groups (REGs) are selected to constitute the CCE in at least one of manners described below.

For a physical downlink control channel (PDCCH) based on a demodulation reference signal (DMRS), when a mapping between the CCE and the REGs is a distributed mapping, the following principle is at least satisfied: a group of M REGs at equal intervals or discrete intervals in frequency domain constitute the CCE, where M is a number of REGs included in K resource blocks (RBs) in a transmission time interval (TTI), and K and N are both positive integers.

For a PDCCH based on a cell reference signal, when the mapping between the CCE and the REGs is the distributed mapping, the following principle is at least satisfied: in a single symbol a group of REGs at equal intervals or discrete intervals in the frequency domain constitute the CCE.

In the above step, part of the N REGs are selected to constitute the CCE in the manners in step S302, and then a scheme for determining the CCE can be separately provided for the PDCCH based on the DMRS and the PDCCH based on the cell reference signal.

A value of K may be, for example, 1, 2 and 3.

In an embodiment, when the mapping between the CCE and the REGs is a centralized mapping, a group of REGs continuous in the frequency domain in the single symbol constitute the CCE, and to avoid that a REG used at a high aggregation level completely includes a REG used at a low aggregation level, an aggregation level is indicated using an interleaving method or physical layer signaling, or different aggregation levels of information are differently scrambled.

In an embodiment of the present application, the interleaving method includes: sequentially writing indexes of REGs included in a candidate set with an aggregation level L into an interleaver and reading out the indexes from the interleaver according to a column permutation pattern, and deleting null elements, where a REG index greater than X is defined as a null element.

L is equal to 1, 2, 4 or 8, that is, a value of L may be 1, 2, 4 or 8.

$X=L \cdot M-1$, and M denotes a number of REGs included in each CCE.

In an embodiment, the column permutation pattern includes at least one of:

<1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>; or

<0, 4, 8, 12, 16, 20, 24, 28, 1, 5, 9, 13, 17, 21, 25, 29, 2, 6, 10, 14, 18, 22, 26, 30, 3, 7, 11, 15, 19, 23, 27, 31>.

Embodiment Four

This embodiment further provides a device for determining a control channel element (CCE). The device is used for implementing the above-mentioned embodiments and application embodiments. What has been described will not be repeated. As used below, the term "module" may be at least one of software, hardware or a combination thereof capable of implementing predetermined functions. The device in the embodiments described below is preferably implemented by software, but implementation by hardware or by a combination of software and hardware is also possible and conceived.

FIG. 4 is a block diagram of a device for determining a CCE according to an embodiment of the present application. As shown in FIG. 4, the device includes a selection module 40.

The selection module 40 is configured to select part of N resource element groups (REGs) to constitute the CCE in at least one of manners described below.

For a physical downlink control channel (PDCCH) based on a demodulation reference signal (DMRS), when a mapping between the CCE and the REGs is a distributed mapping, the following principle is at least satisfied: a group of M REGs at equal intervals or discrete intervals in frequency domain constitute the CCE, where M is a number of REGs included in K resource blocks (RBs) in a transmission time interval (TTI), and K and N are both positive integers.

For a PDCCH based on a cell reference signal, when the mapping between the CCE and the REGs is the distributed mapping, the following principle is at least satisfied: in a single symbol a group of REGs at equal intervals or discrete intervals in the frequency domain constitute the CCE.

In the technical solution, part of the N REGs are selected to constitute the CCE in the preceding manners, and then a scheme for determining the CCE can be separately provided for the PDCCH based on the DMRS and the PDCCH based on the cell reference signal.

Embodiment Five

Figures 8, 9:
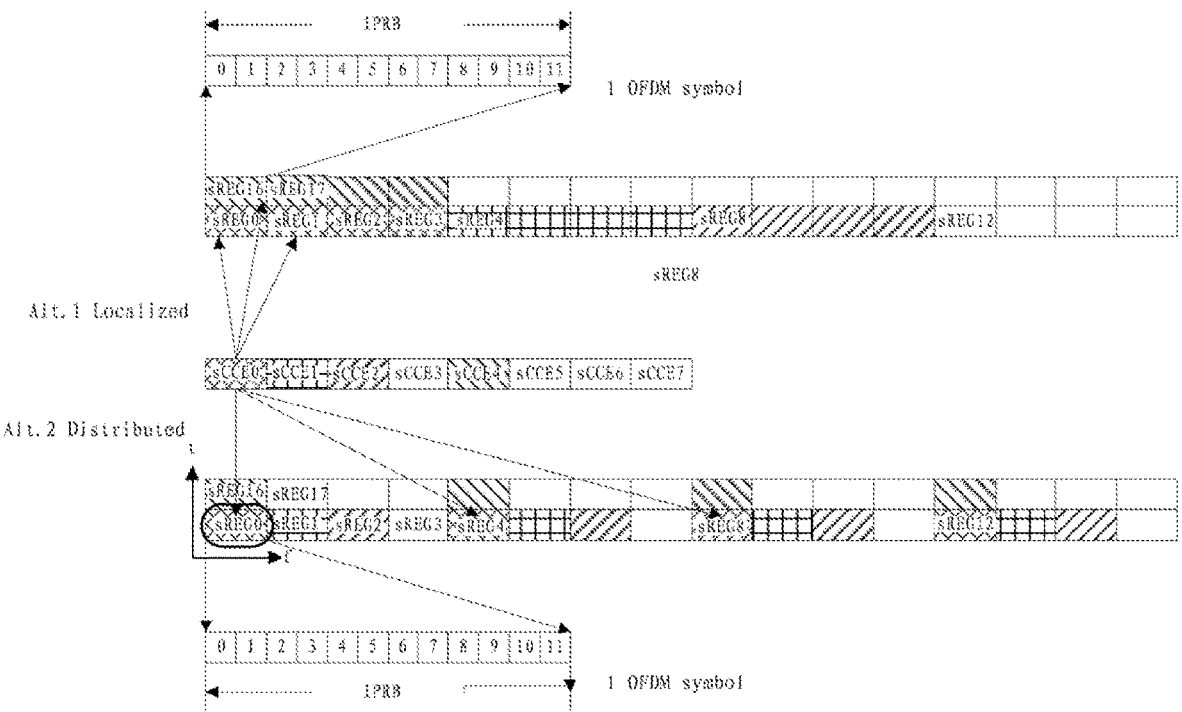
FIG. 8 is a schematic diagram of a centralized mapping and a distributed mapping according to another optional embodiment of the present application.
FIG. 9 is a flowchart of a method for determining a reference signal according to another embodiment of the present application.

An embodiment of the present application further provides a method for determining a reference signal. FIG. 9 is a flowchart of a method for determining a reference signal according to another embodiment of the present application. As shown in FIG. 9, the method includes step S902.

In step S902, it is determined, in a preset manner, that the reference signal exists in at least one of each N transmission time intervals (TTIs) in a semi-persistent scheduling (SPS) transmission.

N is a positive integer.

It is to be noted that a value of N may be 2 in an application embodiment of the present application.

In an embodiment, a time domain position of the reference signal is fixed in the TTIs, and the preset manner includes at least one of manners described below.

In a manner one, it is predefined that the reference signal exists in a first TTI among the each N TTIs.

In a manner two, it is indicated, via signaling, whether a reference signal density is reduced in the each N TTIs, where not reducing the reference signal density means that all of the N TTIs include reference signals, and reducing the reference signal density means that reference signals are comprised in TTIs the number of which is less than N.

In a manner three, a reference signal pattern in the each N TTIs is indicated via the signaling.

In an embodiment, the reference signal density is reduced in at least one of the following manners: only the first TTI includes the reference signal; only the first TTI and a last TTI include reference signals; or only the first TTI and a TTI with an offset of x TTIs from the first TTI include reference signals, where x is an integer selected from a set [0, N].

In an embodiment, the time domain position of the reference signal is unfixed in the TTIs, and the preset manner includes at least one of manners described below.

In a manner one, it is predefined that, in the each N TTIs, the N TTIs all include reference signals.

In a manner two, it is predefined that, in the each N TTIs, a first TTI includes the reference signal.

In a manner three, it is indicated, via the signaling, whether the reference signal density is reduced in the each N TTIs, where not reducing the reference signal density means that all of the N TTIs include reference signals, and reducing the reference signal density means that reference signals are comprised in TTIs the number of which is less than N. In an embodiment, 1-bit signaling may be used for indicating whether the reference signal density is reduced in the each N TTIs.

In a manner four, the reference signal pattern in the each N TTIs is indicated via the signaling.

In an embodiment, among the each N TTIs, the reference signal is included in a first orthogonal frequency division multiplexing (OFDM) symbol in a TTI including the reference signal.

In an embodiment, the reference signal density is reduced in at least one of the following manners: only the first TTI includes the reference signal; only the first TTI and the last TTI include reference signals; or only the first TTI and the TTI with the offset of x TTIs from the first TTI include reference signals, where x is an integer selected from the set [0, N].

In an embodiment, a TTI where a first traffic transmission for activating the SPS transmission is performed includes the reference signal.

In an embodiment, in a case where the signaling is physical layer signaling, the signaling is valid for a period of one TTI, and all bits corresponding to the signaling are set to 0 for other periods, for validation of an activation or a deactivation of the SPS transmission; or the signaling has different meanings for the period of one TTI and the other periods, where the signaling is valid for the period of one TTI and is used for a reference signal indication in the each N TTIs, and the signaling is used for a reference signal indication in a single TTI for the other periods.

In an embodiment, the method is applied to SPS with the period of one TTI.

Embodiment Six

Figure 10:
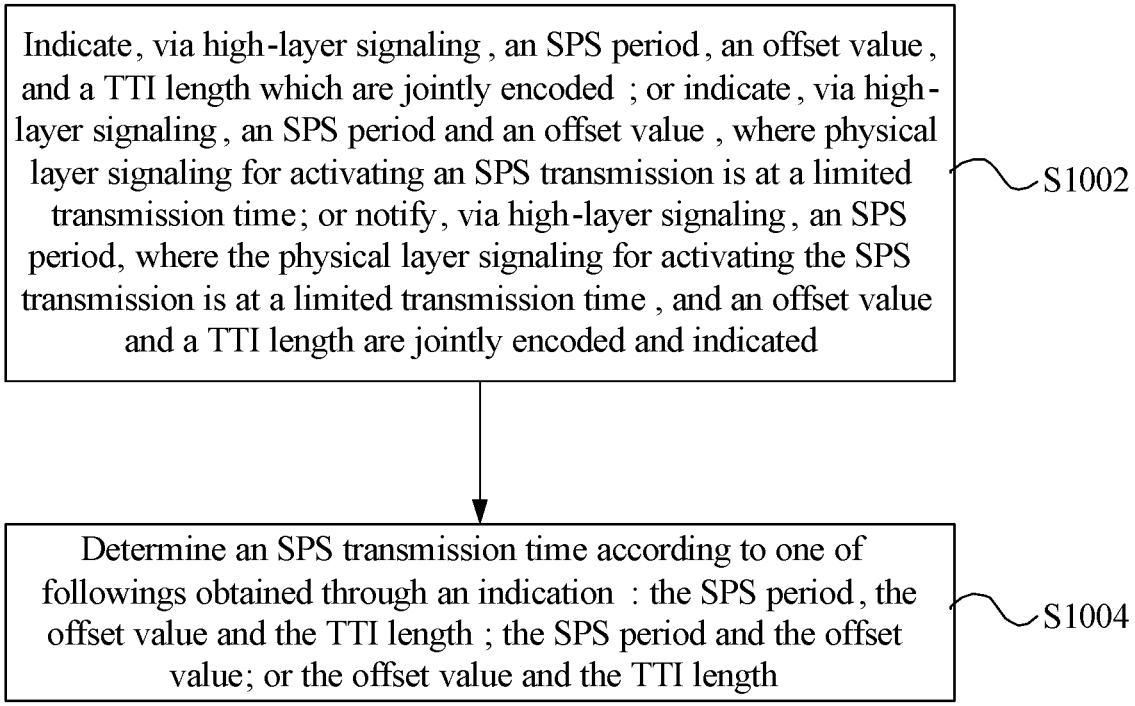
FIG. 10 is a flowchart of a method for determining a semi-persistent scheduling (SPS) transmission time according to an embodiment of the present application.

An embodiment of the present application further provides a method for determining a semi-persistent scheduling (SPS) transmission time. FIG. 10 is a flowchart of a method for determining an SPS transmission time according to an embodiment of the present application. As shown in FIG. 10, the method includes step S1002 and step S1004.

In step S1002, an SPS period, an offset value, and a transmission time interval (TTI) length are indicated via high-layer signaling, where the TTI length is jointly encoded with the SPS period and the offset value; or an SPS period and an offset value are indicated via high-layer signaling, wherein physical layer signaling for activating an SPS transmission is at a limited transmission time; or an SPS period is notified via high-layer signaling, where physical layer signaling for activating an SPS transmission is at a limited transmission time and an offset value and a TTI length are jointly encoded and indicated.

In step S1004, the SPS transmission time is determined according to one of the followings which are obtained through an indication: the SPS period, the offset value, and the TTI length; the SPS period and the offset value; or the offset value and the TTI length.

In an embodiment, the joint encoding at least includes that: if the SPS period and the offset value are indicated in a unified way, a number of offset values for each period is a number of short TTIs and traffic durations included in the SPS period; or a number of offset values for each period is less than or equal to a number of short TTIs and traffic durations included in the SPS period.

In an embodiment, the limited transmission time includes at least one of: locating at a physical downlink control channel (PDCCH), locating at at least one of a short TTI (sTTI) #0 or a sTTI #3 (that is, sTTIs with indexes of 0 and 3), locating at a control resource set which is configured in a slot and located in first P symbols in the slot, or locating at a first control resource set in time domain among a plurality of control resource sets configured in the slot, where a value of P includes 1, 2, 3 and 7, that is, the value of P may be 1, 2, 3 or 7.

Embodiment Seven

This embodiment further provides a device for determining a reference signal. The device is used for implementing the above-mentioned embodiments and application embodiments. What has been described will not be repeated. As used below, the term "module" may be at least one of software, hardware or a combination thereof capable of implementing predetermined functions. The device in the embodiments described below is preferably implemented by software, but implementation by hardware or by a combination of software and hardware is also possible and conceived.

Figure 11:
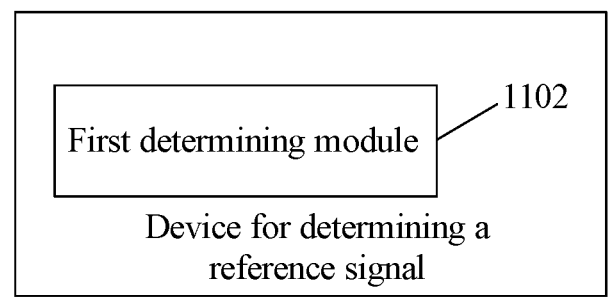
FIG. 11 is a block diagram of a device for determining a reference signal according to another embodiment of the present application.

FIG. 11 is a block diagram of a device for determining a reference signal according to another embodiment of the present application. As shown in FIG. 11, the device includes a first determining module 1102.

The first determining module 1102 is configured to determine, in a preset manner, that the reference signal exists in at least one of each N transmission time intervals (TTIs) in a semi-persistent scheduling (SPS) transmission, where N is a positive integer.

It is to be noted that a value of N may be 2 in an application embodiment of the present application.

In an embodiment, a time domain position of the reference signal is fixed in the TTIs, and the preset manner includes at least one of manners described below.

In a manner one, it is predefined that the reference signal exists in a first TTI among the each N TTIs.

In a manner two, it is indicated, via signaling, whether a reference signal density is reduced in the each N TTIs, where not reducing the reference signal density means that all of the N TTIs include reference signals, and reducing the reference signal density means that reference signals are comprised in TTIs the number of which is less than N.

In a manner three, a reference signal pattern in the each N TTIs is indicated via the signaling.

In an embodiment, the reference signal density is reduced in at least one of the following manners: only the first TTI includes the reference signal; only the first TTI and a last TTI include reference signals; or only the first TTI and a TTI with an offset of x TTIs from the first TTI include reference signals, where x is an integer selected from a set [0, N].

In an embodiment, the time domain position of the reference signal is unfixed in the TTIs, and the preset manner includes at least one of manners described below.

In a manner one, it is predefined that, in the each N TTIs, the N TTIs all include reference signals.

In a manner two, it is predefined that, in the each N TTIs, a first TTI includes the reference signal.

In a manner three, it is indicated, via the signaling, whether the reference signal density is reduced in the each N TTIs, where not reducing the reference signal density means that all of the N TTIs include reference signals, and reducing the reference signal density means that reference signals are comprised in TTIs the number of which is less than N. In an embodiment, 1-bit signaling may be used for indicating whether the reference signal density is reduced in the each N TTIs.

In a manner four, the reference signal pattern in the each N TTIs is indicated via the signaling.

In an embodiment, among the each N TTIs, the reference signal is included in a first orthogonal frequency division multiplexing (OFDM) symbol in each of the N TTIs.

In an embodiment, the reference signal density is reduced in at least one of the following manners: only the first TTI includes the reference signal; only the first TTI and the last TTI include reference signals; or only the first TTI and the TTI with the offset of x TTIs from the first TTI include reference signals, where x is an integer selected from the set [0, N].

In an embodiment, a TTI where a first traffic transmission for activating the SPS transmission is performed includes the reference signal.

In an embodiment, in a case where the signaling is physical layer signaling, the signaling is valid for a period of one TTI, and all bits corresponding to the signaling are set to 0 for other periods, for validation of an activation or a deactivation of the SPS transmission; or the signaling has different meanings for the period of one TTI and the other periods, where the signaling is valid for the period of one TTI and is used for a reference signal indication in the each N TTIs, and the signaling is used for a reference signal indication in a single TTI for the other periods.

In an embodiment, the method is applied to SPS with the period of one TTI.

Embodiment Eight

This embodiment further provides a device for determining an SPS transmission time. The device is used for implementing the above-mentioned embodiments and application embodiments. What has been described will not be repeated. As used below, the term "module" may be at least one of software, hardware or a combination thereof capable of implementing predetermined functions. The device in the embodiments described below is preferably implemented by software, but implementation by hardware or by a combination of software and hardware is also possible and conceived.

Figure 12:
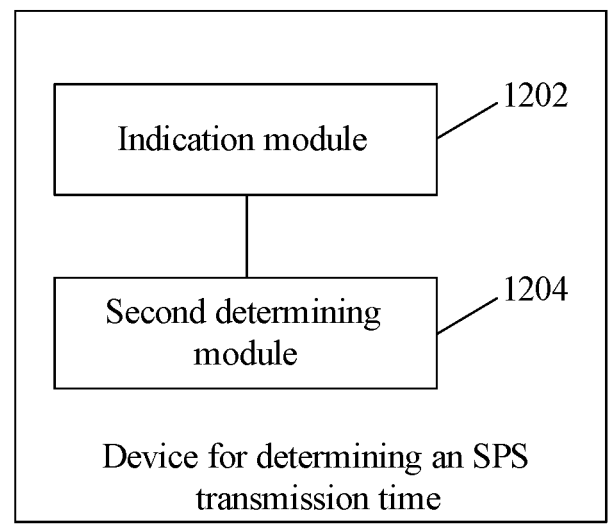
FIG. 12 is a block diagram of a device for determining an SPS transmission time according to an embodiment of the present application.

FIG. 12 is a block diagram of a device for determining an SPS transmission time according to an embodiment of the present application. As shown in FIG. 12, the device includes an indication module 1202 and a second determining module 1204.

The indication module 1202 is configured to jointly encode and indicate, via high-layer signaling, an SPS period, an offset value, and a transmission time interval (TTI) length; or indicate, via high-layer signaling, an SPS period and an offset value, where physical layer signaling for activating an SPS transmission is at a limited transmission time; or notify, via high-layer signaling, an SPS period, where physical layer signaling for activating an SPS transmission is at a limited transmission time, and an offset value and a TTI length are jointly encoded and indicated.

The second determining module 1204 is configured to determine the SPS transmission time according to one of the followings which are obtained through an indication: the SPS period, the offset value, and the TTI length; the SPS period and the offset value; or the offset value and the TTI length.

The technical solutions described above are explained and described below in conjunction with application embodiments one to five, which are not intended to limit the technical solutions in the embodiments of the present application.

Application Embodiment One

Figure 5:
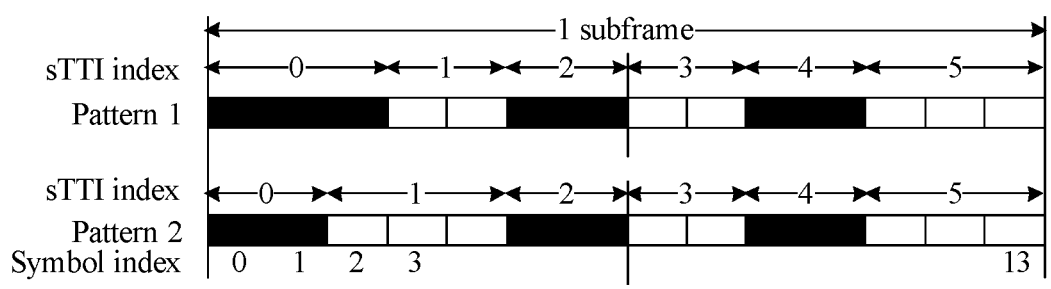
FIG. 5 is a structural diagram of a downlink short transmission time interval (sTTI) according to an optional embodiment of the present application.

A base station schedules a terminal A to perform downlink data transmissions in multiple TTIs. The TTI includes a small number of OFDM symbols, for example, no more than 7 OFDM symbols, but it is not limited thereto. This embodiment describes a structure of a short TTI (sTTI) in a Long-Term Evolution (LTE) system. That is, the TTI may be understood as an sTTI, but it is not limited thereto. A frame structure of a downlink (DL) short TTI is shown in FIG. 5. A subframe of 1 ms includes 6 DL sTTIs. When an sPDSCH is configured to start from an OFDM symbol #1 or #3, a pattern 1 is used. When the sPDSCH is configured to start from an OFDM symbol #2, a pattern 2 is used. It should be illustrated that the OFDM symbols are numbered from 0, that is, 14 OFDM symbols in the subframe of 1 ms are sequentially numbered #0 to #13.

DCI for scheduling multiple sTTIs may be transmitted in any DL sTTI. When the DCI is in a DL sTTI #0, the DCI is carried in a PDCCH. When the DCI is in DL sTTIs #1 to #5, the DCI is carried in an sPDCCH. Alternatively, the DCI for scheduling the multiple sTTIs may be transmitted in part of the sTTIs, for example, the DCI is only transmitted in the DL sTTI #0, or in the DL sTTIs #0 and #3.

When the multiple sTTIs are scheduled for transmission, a maximum number N of sTTIs are scheduled for transmission. In this case, N consecutive sTTIs may be used for transmitting the sPDSCH. In an embodiment, there is a scene where the sPDSCH cannot be in the sTTI #0, that is, the sPDSCH is configured to start from the OFDM symbol #2 or #3, and the sTTI #0 cannot be used for the sPDSCH transmission. For example, N may be, but is not limited to, 2, 3, 4, 6, 8, 12 or 16. When the maximum number N of sTTIs are determined to be scheduled for transmission, a practical number of sTTIs scheduled for transmission may be one of 1 to N. A value of N is determined in a predefined manner, or configured via high-layer signaling. An example in which N=4 is used for the following description, but it is not limited thereto.

In the N=4 DL sTTIs scheduled for transmission, a position of a demodulation reference signal (DMRS) which may be understood as the reference signal in the embodiments described above is determined in at least one of manners described below. It is to be illustrated that though the downlink transmission is taken as an example for description in this embodiment, a manner for determining the position of the DMRS is not only used for the downlink transmissions but also used for uplink transmission. This embodiment describes a scenario where the DMRS is fixed in the TTIs.

In a manner one, each sTTI has the DMRS by default.

A beneficial effect is that no additional indication is needed. Standardization is not needed. A multi-sTTI scheduling mechanism is the same as an eLAA multi-subframe scheduling mechanism. A DMRS overhead is the same as an overhead in single sTTI scheduling and there is no saving.

In a manner two, the DMRS exists in a first scheduled sTTI by default and there is no DMRS in the remaining sTTIs.

A beneficial effect is that no additional indication is needed. The DMRS overhead may be saved, and the standardization is simple. The manner 2 is applicable to a non-high-speed moving scenario.

In a manner three, one sTTI including the DMRS among the N scheduled sTTIs is only indicated.

In this manner, the one sTTI including the DMRS is any one of the multiple sTTIs scheduled. Taking N=4 as an example, if it is only considered that one sTTI includes the DMRS, 2 bits indicate one of the 4 sTTIs.

A beneficial effect is that the DMRS overhead may be saved, and the sTTI including the DMRS may be flexibly indicated and is not limited to the first sTTI among the multiple sTTIs.

In a manner four, at most N sTTIs each including the DMRS among the N scheduled sTTIs are indicated.

In this manner, the sTTI including the DMRS is any one of the multiple sTTIs scheduled and at most N sTTIs include DMRSs. Taking N=4 as an example, 4 bits act as a bitmap to indicate that at most 4 sTTIs include the DMRSs.

A beneficial effect is that the DMRS overhead may be saved and an indication has the largest overheads and highest flexibility. The sTTI including the DMRS may be any sTTI and at most N sTTIs include the DMRSs.

In a manner five, among the multiple sTTIs scheduled, at most 2 sTTIs each including the DMRS are only indicated.

In this manner, it is indicated that among the N sTTIs, at most 2 sTTIs include DMRSs. For example, when N=4, 4 bits are needed to indicate a total of 10 ($C_4^1=C_4^2$32 4+6=10) possibilities; i.e., there is one sTTI including the DMRS (4 possibilities) or there are 2 sTTIs each including the DMRS (6 possibilities). For another example, when N=6, 5 bits are needed to indicate a total of 21 ($C_6^1+C_6^2=6+15=21$) possibilities, i.e., there is one sTTI including the DMRS (6 possibilities) or there are 2 sTTIs each including the DMRS (15 possibilities).

A beneficial effect is that the sTTIs including the DMRSs are flexibly indicated, the DMRS at most exists in any two sTTIs, and indication overheads are equal to or less than that of the manner four.

In a manner six, among the N scheduled sTTIs, whether the remaining sTTIs except the first sTTI carry the DMRS and positions of the sTTIs carrying the DMRS are indicated. The first sTTI always includes the DMRS by default, and whether another sTTI includes the DMRS and the position of the other sTTI including the DMRS are indicated.

The manner six further includes a sub-manner 6-1 and a sub-manner 6-2. In the sub-manner 6-1, it is indicated that one sTTI in the remaining sTTIs, except the first sTTI, includes the DMRS. For example, when N=4, as shown in table 1, 2 bits are used for indicating whether another sTTI includes the DMRS and the position of the other sTTI including the DMRS.

TABLE 1

| 2-bit Indication | Whether another sTTI includes the DMRS and the position |
| --- | --- |
| 00 | The remaining sTTIs do not include the DMRS. |
| 01 | A second sTTI includes the DMRS. |
| 10 | A third sTTI includes the DMRS. |
| 11 | A fourth sTTI includes the DMRS. |

In the sub-manner 6-2, 1 bit is used for indicating whether another sTTI includes the DMRS. For example, in a case where another sTTI includes the DMRS, the other sTTI is fixed at the last sTTI among the multiple sTTIs scheduled.

A beneficial effect is that the DMRS overhead may be saved, and fewer indication overheads are required to indicate that another sTTI includes the DMRS, which is applicable to a medium-low speed moving scenarios and a high-speed moving scenario. For example, except the high-speed scenario, only a single sTTI including the DMRS is sufficient in other cases. That is, another sTTI including the DMRS is provided mainly to support the high-speed moving scenario.

In a manner seven, one of predefined DMRS patterns is indicated. The predefined DMRS patterns are separately defined for the practical number of scheduled sTTIs in the multiple scheduled sTTIs, or the predefined DMRS patterns and the number of scheduled sTTIs are jointly encoded.

The predefined DMRS patterns are separately defined for the practical number of scheduled sTTIs in the multiple scheduled sTTIs. For example, when N=4, the practical number n of scheduled sTTIs is 1, 2, 3 or 4 at the time of scheduling at most N=4 sTTIs. As shown in table 2, a set of predefined DMRS patterns are separately defined according to different numbers of sTTIs practically scheduled. According to the number of sTTIs practically scheduled, the position(s) of the sTTI(s) including the DMRS(s) is/are indicated when n sTTIs are practically scheduled, that is, one predefined DMRS pattern in the set of predefined DMRS patterns is indicated. It is to be illustrated that pilot patterns listed in the table are only examples, and it is not limited thereto.

TABLE 2

| 2-bit Indication | n = 1 | n = 2 | n = 3 | n = 4 |
|---|---|---|---|---|
| 00 | It is the same as a single sTTI, and an indication is invalid. | RD | RDD | RDDD |
| 01 | | DR | DRD | RDDR |
| 10 | | | DDR | DRDD |
| 11 | | | RDR | DDRD |

Note: R represents that the sTTI includes the DMRS, and D represents that there is no DMRS in the sTTI. Taking N=2 as an example, RD represents that the first sTTI includes the DMRS, and there is no DMRS in the second sTTI. It is the same for the rest of the above table 2, and details are not described here again.

The predefined DMRS patterns and the number of scheduled sTTIs are jointly encoded for example. When N=4, the number n of practically scheduled sTTIs is 1, 2, 3 or 4 for at most N=4 sTTIs are scheduled. As shown in table 3, in response to determining different numbers of practically scheduled sTTIs, the set of predefined DMRS patterns and the number of scheduled sTTIs are joint to indicate the number of practically scheduled sTTIs and the position of the sTTI including the DMRS, i.e., one predefined DMRS pattern in the set of predefined DMRS patterns. It is to be illustrated that pilot patterns listed in the table are only examples, and it is not limited thereto.

TABLE 3

| 3-bit Indication | Pilot Pattern and the Number of Scheduled sTTIs | Description |
|---|---|---|
| 000 | Single sTTI scheduling | It indicates that one sTTI is scheduled and the one sTTI includes the DMRS. |
| 001 | RD | It indicates that two sTTIs are scheduled and the first sTTI includes the DMRS. |
| 010 | DR | It indicates that two sTTIs are scheduled and the second sTTI includes the DMRS. |
| 011 | RDD | It indicates that three sTTIs are scheduled and the first sTTI includes the DMRS. |
| 100 | RDR | It indicates that three sTTIs are scheduled, and the first sTTI and the third sTTI include the DMRSs. |
| 101 | RDDD | It indicates that four sTTIs are scheduled and the first sTTI includes the DMRS. |
| 110 | DRDD | It indicates that four sTTIs are scheduled and the second sTTI includes the DMRS. |
| 111 | RDRD | It indicates that four sTTIs are scheduled, and the first sTTI and the third sTTI include the DMRSs. |

Note: R represents that the sTTI includes the DMRS, and D represents that there is no DMRS in the sTTI. Taking N=2 as an example, RD represents that the first sTTI includes the DMRS, and there is no DMRS in the second sTTI. It is the same for the rest, and details are not described here again.

A beneficial effect is that the DMRS overhead may be saved, fewer indication overheads are required to indicate that another sTTI includes the DMRS, and a multi-sTTI pilot pattern may be designed for the multi-sTTI scheduling, which is applicable to a medium-low speed moving scenarios and a high-speed moving scenario. An indication through joint encoding may further save control overheads.

In addition, for DL multi-sTTI scheduling, the sPDSCH is supported to use a resource unused by the sPDCCH in at least one of manners described below.

In a manner one, when the multi-sTTI scheduling is performed, only the first sTTI supports the sPDSCH to use the resource unused by the sPDCCH.

Considering that only a current sTTI supports the function that the sPDSCH uses the resource unused by the sPDCCH under the condition that the single sTTI scheduling supports the sPDSCH to use the resource unused by the sPDCCH, a resource usage situation of the sPDCCH in a subsequent sTTI cannot be predicted, and at the same time multiple sPDSCHs in the multi-sTTI scheduling are independently encoded, then the operation can be performed in a case where only the first sTTI supports the function. Therefore, when an indication is displayed, an indication field of an unused/used sCCE is only valid for the first sTTI among the multiple sTTIs. That is, when the multi-sTTI scheduling is performed, only the first sTTI supports the sPDSCH to use the resource unused by the sPDCCH.

In a manner two, when the multi-sTTI scheduling is performed, the function is not supported.

That is, an unused sPDCCH resource is reused by the sPDSCH in the single sTTI scheduling.

In a manner three, when the multi-sTTI scheduling is performed, all the sTTIs reuse the same unused sCCE resource as the first sTTI.

A limitation of the manner three is that: an index of an sCCE used by the sPDCCH in the same RB set in the subsequent sTTI cannot be greater than an index of the sCCE used by the sPDCCH for the multi-sTTI scheduling in the first sTTI.

Additionally, for the multi-TTI scheduling, a feedback timing is implicitly determined according to a position of the DMRS. The feedback timing is a timing of an ACK/NACK for a PDSCH or a PUSCH. The feedback timing of the multi-sTTI scheduling service is determined according to the position of the sTTI including the DMRS among the multiple sTTIs in at least one of manners described below.

In a manner one, when among the multiple TTIs only one TTI includes the DMRS, it is assumed that a timing of feeding an ACK/NACK back when the first sTTI includes the DMRS is k1, a timing of feeding the ACK/NACK back when another sTTI except the first sTTI includes the DMRS is k2, and k1<k2.

In a manner two, when among the multiple TTIs more than one TTI includes the DMRS, it is assumed that a timing of feeding the ACK/NACK back when a last sTTI includes the DMRS is k3, a timing of feeding the ACK/NACK back when the last sTTI includes no DMRS is k4, and k3>k4.

Through the technical solutions provided by this application embodiment, when the multi-sTTI scheduling is performed, the DMRS overhead may be saved, and fewer indication overheads are required to indicate that one or more sTTIs include the DMRS, so that the technical solutions are applicable to a medium-low speed moving scenario and a high-speed moving scenario. Meanwhile, after the pilot overheads are saved, more resources may be used for data transmission, thereby improving a spectral efficiency of a system.

Application Embodiment Two

Figure 6:
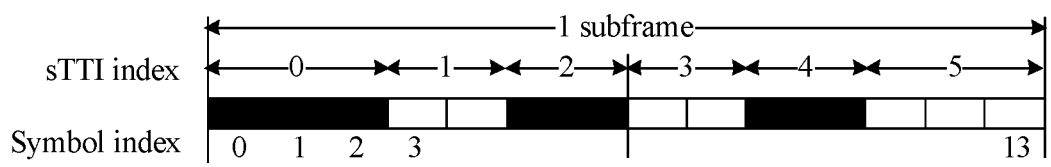
FIG. 6 is a structural diagram of an uplink sTTI according to an optional embodiment of the present application.

A base station schedules a terminal A to transmit uplink data in multiple TTIs. The TTI includes a small number of OFDM symbols, for example, no more than 7 OFDM symbols. This application embodiment describes a structure of a short TTI (sTTI) in an LTE system, but it is not limited thereto. A frame structure for an uplink (UL) short TTI is shown in FIG. 6. A subframe of 1 ms includes 6 UL sTTIs. It should be noted that the OFDM symbols are numbered from 0, that is, 14 OFDM symbols in the subframe of 1 ms are sequentially numbered #0 to #13.

DCI for scheduling multiple sTTIs may be transmitted in any DL sTTI. When the DCI is in a DL sTTI #0, the DCI is carried in a PDCCH. When the DCI is in DL sTTIs #1 to #5, the DCI is carried in an sPDCCH. Alternatively, the DCI for scheduling the multiple sTTIs may be transmitted in part of the sTTIs, for example, the DCI is only transmitted in the DL sTTI #0, or in DL sTTIs #0 and #3.

When the multiple sTTIs are scheduled for transmission, a maximum number N of sTTIs are scheduled for transmission. In this case, N consecutive sTTIs may be used for transmission of the sPUSCH. For example, N may be, but is not limited to, 2, 3, 4, 6 or 8. When the maximum number N of sTTIs are determined to be scheduled for transmission, the number of sTTIs practically scheduled for transmission may be 1 to N. A value of N is determined in a predefined manner, or configured via high-layer signaling. An example in which N=4 is used for the following description, but it is not limited thereto.

During N=4 UL sTTIs scheduled for transmission, a position of a DMRS is determined in at least one of manners described below. It is to be illustrated that, though the uplink transmission is taken as an example for description in this embodiment, a manner for determining the position of the DMRS is not only used for the uplink transmission but also used for the downlink transmission. This embodiment describes, for example, a scenario where the DMRS is unfixed in the TTIs.

In a manner one, a DMRS pattern is the same as a DMRS pattern in single sTTI scheduling, and an UL DMRS is indicated in the same manner as a single sTTI. In the manner one, a DMRS pattern in a first scheduled sTTI is indicated, and no indication is for the subsequent sTTIs. A limitation is that a pure D pattern and IR pattern cannot be indicated in the first sTTI, and a pattern including R must be indicated.

A supplemental instruction is that UL DMRS patterns for the single sTTI scheduling are shown in table 4: the UL DMRS patterns include at least patterns listed in table 1, and may also include other patterns.

TABLE 4

UL DMRS position in the single sTTI scheduling
DMRS position pattern indicated by a UL grant scheduling
sPUSCH in sTTI n

| sTTI 0 | sTTI 1 | sTTI 2 | sTTI 3 | sTTI 4 | sTTI 5 |
|---|---|---|---|---|---|
| R D D | R D | R D | R D | R D | R D D |
| D D R | D R | D D | D R | D R | |
| | D D | | D D \| R | D D | |
| | D D \| R | | | D D \| R | |

It is to be illustrated that "|" in table 4 represents a boundary of the sTTI n.

A beneficial effect is that a new pattern structure does not need to be designed, that is, the pattern still has the structure in the single sTTI scheduling. Control overhead is not increased. Meanwhile, among the multiple UL sTTIs scheduled, the remaining sTTIs except the first sTTI include no DMRS.

In a manner two, the DMRS pattern is the same as the DMRS pattern in the single sTTI scheduling, a bit field is the same as that of the single sTTI, but a position of an sTTI including the DMRS needs to be indicated. In the manner two, a DMRS pattern in the sTTI including the DMRS is indicated, and there is no indication for the remaining sTTIs. A limitation is that the pure D pattern and IR pattern cannot be indicated for the indicated sTTI, and the pattern including the R must be indicated.

A beneficial effect is that a new pattern structure does not need to be designed, that is, the pattern still has the structure in the single sTTI scheduling. A flexible indication of the position including the DMRS is supported. Meanwhile, only one of the multiple UL sTTIs scheduled includes the DMRS.

In a manner three, the DMRS pattern is the same as the DMRS pattern in the single sTTI scheduling, the bit field is N times that of the single sTTI, and each sTTI is independently indicated. For example, when N=4, the bit field is 4 times a bit field for indicating the DMRS position in the single sTTI scheduling. The DMRS corresponding to each sTTI practically scheduled is indicated. This manner has highest flexibility and largest overheads. For example, when n=2 sTTIs are practically scheduled, assuming that the bit field for indicating the UL DMRS position has 2 bits in the single sTTI scheduling, the bit field in the multi-sTTI scheduling has 8 bits, and first 4 bits of the 8 bits are valid because 2 UL sTTIs are practically scheduled. First 2 bits of the valid 4 bits indicate an UL DMRS position in a first UL sTTI scheduled, and last 2 bits indicate an UL DMRS position in a second sTTI scheduled.

A beneficial effect is that the new pattern structure does not need to be designed, that is, the pattern still has the structure in the single sTTI scheduling, and larger control overhead is to support the flexible indication.

In a manner four, among the N scheduled sTTIs, whether the remaining sTTIs except the first sTTI carry the DMRS and a position thereof are indicated. The first sTTI always includes the DMRS by default, and whether another sTTI includes the DMRS, the position of the sTTI including the DMRS, and a symbol where the DMRS is located in the sTTI are indicated. The symbol where the DMRS is located in one sTTI is indicated in the same manner as the DMRS position in the single sTTI scheduling.

The manner four further includes a sub-manner 4-1 and a sub-manner 4-2. In the sub-manner 4-1, it is indicated that one sTTI of the remaining sTTI except the first sTTI includes the DMRS and a symbol where the DMRS is located in the one sTTI is indicated. The symbol where the DMRS is located in the one sTTI is indicated in the same manner as the DMRS position in the single sTTI scheduling. For example, when N=4, as shown in table 1, 2 bits are used for indicating whether another one sTTI includes the DMRS and the position of this one sTTI including the DMRS.

TABLE 1

| 2-bit Indication | Whether another one sTTI includes the DMRS and its position |
|---|---|
| 00 | The remaining sTTIs do not include the DMRS. |
| 01 | The second sTTI includes the DMRS. |
| 10 | The third sTTI includes the DMRS. |
| 11 | The fourth sTTI includes the DMRS. |

In the sub-manner 4-2, whether another sTTI includes the DMRS and a symbol where the DMRS is located in the sTTI are indicated. For example, when another sTTI includes the DMRS, the sTTI is fixed as the last sTTI among the multiple sTTIs scheduled. One bit may be used for indicating whether another sTTI includes the DMRS. The symbol where the DMRS is located in the sTTI is indicated in the same manner as the DMRS position in the single sTTI scheduling.

A beneficial effect is that the DMRS overhead may be saved, and fewer indication overheads are required to indicate that another sTTI includes the DMRS. The manner four is applicable to a medium-low speed moving scenario and a high-speed moving scenario.

In a manner five, one of predefined DMRS patterns is indicated. The predefined DMRS patterns are separately defined for the number of sTTIs practically scheduled in the multi-sTTI scheduling, or the predefined DMRS patterns and the number of scheduled sTTIs are jointly encoded.

That is, UL DMRS patterns are predefined during the multi-sTTI scheduling and a specific pattern is determined for the multi-sTTI scheduling. The DMRS patterns are predefined when 2, 3, . . . , N consecutive sTTIs are scheduled. When N=4, the DMRS patterns are predefined when 2, 3, and 4 consecutive sTTIs are scheduled.

If the DMRS pattern is unique when 2, 3, . . . , N consecutive sTTIs are scheduled, an indication is not required.

If there are various DMRS patterns predefined respectively when 2, 3, . . . , N consecutive sTTIs are scheduled, one of the various DMRS patterns is indicated.

The predefined DMRS patterns are defined and listed respectively for the number of sTTIs practically scheduled in the multi-sTTI scheduling. As shown in table 5, when N=4, a candidate set of pilot patterns is separately predefined when n=1, 2, 3, 4 consecutive sTTIs are. A meaning of a 2-bit indication is determined according to the number n of consecutively scheduled sTTIs, to indicate one pattern therein. It is to be illustrated that the pilot patterns listed in the table are only examples, and it is not limited thereto.

TABLE 5

| 2-bit Indication | N = 1 | N = 2 | N = 3 | N = 4 |
|---|---|---|---|---|
| 00 | It is the | RD|DD | RD|DD|DD | RD|DD|DD|DD |
| 01 | same as a | DR|DD | DR|DD|DD | DR|DD|DD|DD |
| 10 | single sTTI. | DD|RD | DD|RD|DD | DD|RD|DD|DD |
| 11 | | | RD|DD|RD | RD|DD|RD|DD |

It is to be illustrated that DR corresponds to DDR, and RD corresponds to RDD in a case of 3 OFDM symbols (OS). Taking N=2 as an example, RD|DD indicates that the first sTTI includes the DMRS and the DMRS is located in a first symbol in the first sTTI, and the second sTTI includes no DMRS. It is the same for the rest, and details are not described here again.

The predefined DMRS patterns and the number of scheduled sTTIs are jointly encoded. For example, when N=4, the number n of practically scheduled sTTIs is 1, 2, 3 or 4 when at most N=4 sTTIs are scheduled. As shown in table 6, a set of predefined DMRS patterns and the number of scheduled sTTIs are jointly encoded for different numbers of sTTIs practically scheduled, so as to indicate the number of practically scheduled sTTIs and the position of the sTTI including the DMRS, that is, one predefined DMRS pattern in the set of predefined DMRS patterns. It is to be illustrated that the pilot patterns listed in the table are only examples, and it is not limited thereto.

TABLE 6

| 3-bit Indication | Pilot Pattern and the Number of Scheduled sTTIs | Description |
|---|---|---|
| 000 | RD | It indicates that one sTTI is scheduled and the DMRS is located in the first symbol. |

TABLE 6-continued

| 3-bit Indication | Pilot Pattern and the Number of Scheduled sTTIs | Description |
| --- | --- | --- |
| 001 | RD\|DD | It indicates that two sTTIs are scheduled, and the first symbol in the first sTTI includes the DMRS. |
| 010 | DR\|DD | It indicates that two sTTIs are scheduled, and a last symbol in the first sTTI includes the DMRS. |
| 011 | RD\|DD\|DD | It indicates that three sTTIs are scheduled, and the first symbol in the first sTTI includes the DMRS. |
| 100 | DR\|DD\|RD | It indicates that three sTTIs are scheduled, the last symbol in the first sTTI includes the DMRS, and a first symbol in the third sTTI includes the DMRS. |
| 101 | RD\|DD\|DD\|DD | It indicates that four sTTIs are scheduled, and the first symbol in the first sTTI includes the DMRS. |
| 110 | DR\|DD\|DD\|DD | It indicates that four sTTIs are scheduled, and the last symbol in the first sTTI includes the DMRS. |
| 111 | RD\|DD\|RD\|DD | It indicates that four sTTIs are scheduled, the first symbol in the first sTTI includes the DMRS, and the first symbol in the third sTTI includes the DMRS. |

It is to be illustrated that DR corresponds to DDR and RD corresponds to RDD in the case of 3OS. Taking N=2 as an example, RD|DD indicates that the first sTTI includes the DMRS and the DMRS is located in the first symbol in the first sTTI, and the second sTTI includes no DMRS. It is the same for the rest, and details are not described here again.

A beneficial effect is that this manner has smaller control overhead. Structures of DMRS patterns for the multiple sTTIs need to be designed. An indication through joint encoding may further save the control overhead.

In the method provided by the application embodiment two, when the multi-sTTI scheduling is performed, the DMRS overhead may be saved, and the fewer indication overheads are required to indicate that one or more sTTIs include the DMRS, so that the method is applicable to a medium-low speed moving scenario and a high-speed moving scenario. Meanwhile, after pilot overheads are saved, more resources may be used for data transmission, thereby improving a spectral efficiency of a system.

Application Embodiment Three

A base station schedules a terminal A to perform downlink data transmission in a single TTI or multiple TTIs. Each TTI includes a smaller number of OFDM symbols, for example, not more than 7 OFDM symbols. The application embodiment three describes a structure of a short TTI (sTTI) in an LTE system, but it is not limited thereto. A frame structure of a downlink (DL) short TTI is shown in FIG. 5. A subframe of 1 ms includes 6 DL sTTIs. When an sPDSCH is configured to start from an OFDM symbol #1 or #3, a pattern 1 is used. When the sPDSCH is configured to start from an OFDM symbol #2, a pattern 2 is used. It should be illustrated that the OFDM symbols are numbered from 0, that is, 14 OFDM symbols in the subframe of 1 ms are sequentially numbered #0 to #13.

DCI for scheduling the single TTI or the multiple TTIs may be transmitted in any DL sTTI. When the DCI is in a DL sTTI #0, the DCI is carried in a PDCCH. When the DCI is in DL sTTIs #1 to #5, the DCI is carried in an sPDCCH. Alternatively, the DCI for scheduling the multiple sTTIs may be transmitted in part of the sTTIs, for example, the DCI is only transmitted in the DL sTTI #0, or in DL sTTIs #0 and #3.

The sTTI simultaneously supports a CRS-based sPDCCH and a DMRS-based sPDCCH, both of which support a centralized mapping and a distributed mapping. For the CRS-based sPDCCH, both the centralized mapping and the distributed mapping support a frequency-first time-second sCCE-to-sREG mapping. For the DMRS-based sPDCCH, both the centralized mapping and the distributed mapping support a time-first frequency-second sCCE-to-sREG mapping. For the CRS-based sPDCCH, sREGs are numbered in a frequency-first time-second order. For the DMRS-based sPDCCH, the sREGs are numbered in a time-first frequency-second order.

Therefore, under these conditions, a specific scheme and formula of the sCCE-to-sREG mapping needs to be determined.

It is to be illustrated that in sTTIs #1 to #5, an RB set where the CRS-based sPDCCH is located supports 1 or 2 OFDM symbols, one of which is configured via high-layer signaling. An RB set where the DMRS-based sPDCCH is located has the same number of OFDM symbols as the sTTI where the DMRS-based sPDCCH is located, that is, the RB set supports 2 or 3 OFDM symbols.

For the DMRS-based sPDCCH, it is assumed that the number of PRBs included in the configured RB set $x_m$ is $N_{PRB}$, which is configured via the high-layer signaling. A number of included OFDM symbols is $N_{OFDM}$, which is the same as the number of OFDM symbols included in the sTTI. It is known that one sREG is 1 RB in the OFDM symbol, i.e., 12 REs (including pilots), so the number of sREGs is $N_{sREG} = N_{PRB} \cdot N_{OFDM}$. In the following description, $N_{sREG}^{sCCE}$ denotes the number of sREGs included in an sCCE.

In the case of the centralized mapping, a principle is satisfied: a group of $N_{OFDM}$ sREGs continuous in frequency domain constitute one sCCE. An sREG #m included in an sCCE #n satisfies $n = \lfloor m/N_{sREG}^{sCCE} \rfloor$, or an index of an sREG included in the sCCE #n is $j + n \cdot N_{sREG}^{sCCE}$, where $j = 0, 1, \ldots, N_{sREG}^{sCCE} - 1$ and $n = 0, 1, \ldots, N_{sCCE}^{X_m} - 1$.

In the case of the distributed mapping, a principle is satisfied: a group of $N_{OFDM}$ sREGs discrete at equal intervals in the frequency domain constitute one sCCE. The sREG #m included in the sCCE #n satisfies $$n = \left\lfloor \frac{m \bmod (N_{OFDM} \cdot \lfloor N_{sREG} / N_{sREG}^{sCCE} \rfloor)}{N_{OFDM}} \right\rfloor,$$

or the index of the sREG included in the sCCE #n is $(n+u)(N_{OFDM} \cdot \lfloor N_{sREG}/N_{sREG}^{sCCE} \rfloor)+v$, where $$u = 0, 1, \ldots, \frac{N_{sREG}^{sCCE}}{N_{OFDM}} - 1,$$

$$v = 0, 1, \ldots, N_{OFDM} - 1, \text{ and}$$

$$n = 0, 1, \ldots, N_{sCCE}^{X_m} - 1.$$

Figure 7:
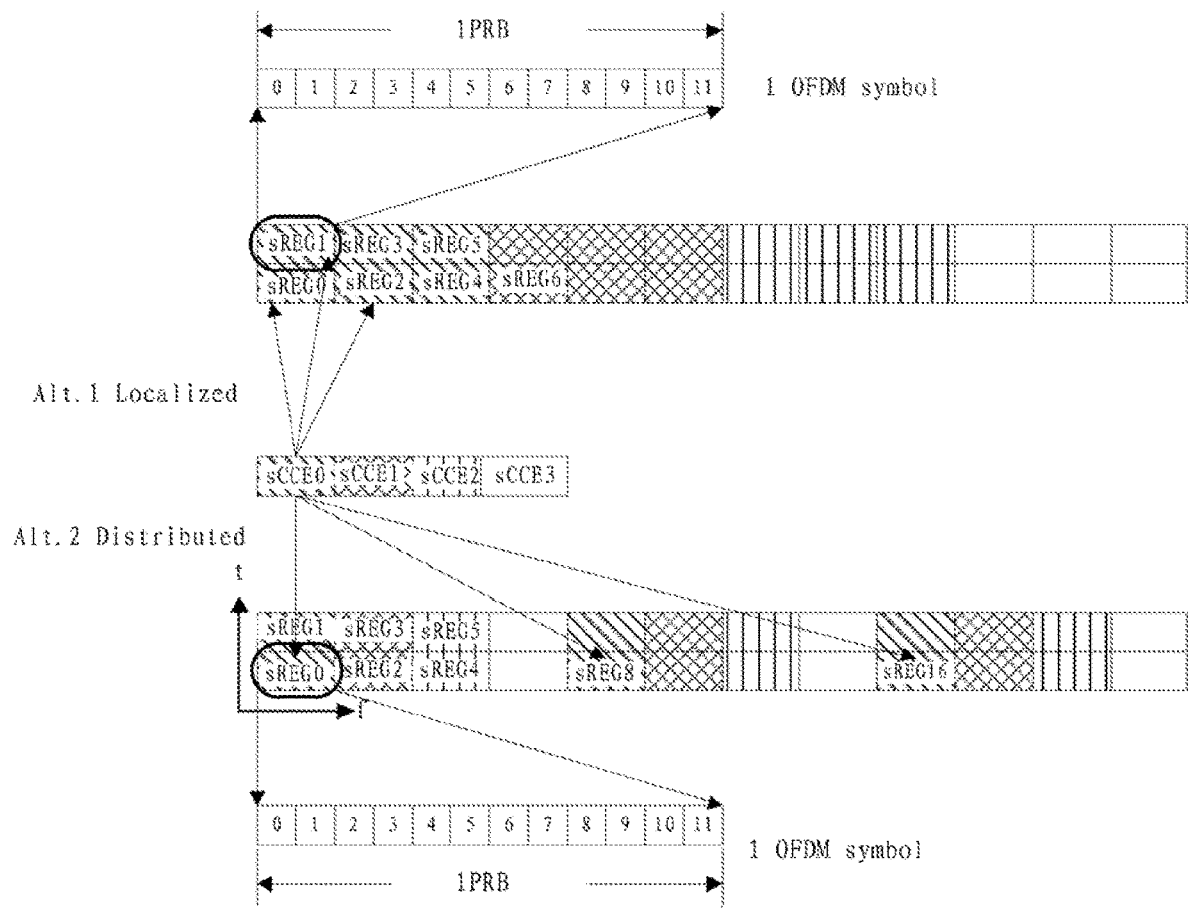
FIG. 7 is a schematic diagram of a centralized mapping and a distributed mapping according to an optional embodiment of the present application.

Taking $N_{OFDM}=2$ and $N_{sREG}^{sCCE}=6$ as an example, when $N_{PRB}=12$ PRBs, a schematic diagram of the centralized mapping and the distributed mapping is shown in FIG. 7.

For the CRS-based sPDCCH, it is assumed that the number of PRBs included in the configured RB set $X_m$ is $N_{PRB}$, and the PRBs are configured via the high-layer signaling. The number of included OFDM symbols is $N_{OFDM}$, and the OFDM symbols are configured via the high-layer signaling. It is known that one sREG is 1 RB in one OFDM symbol, i.e., 12 REs (including pilots), so the number of sREGs is $N_{sREG}=N_{PRB}\cdot N_{OFDM}$. In the following description, $N_{sREG}^{sCCE}$ denotes the number of sREGs included in the sCCE.

In the case of the centralized mapping, a principle is satisfied: a group of sREGs continuous in the frequency domain in a single symbol constitute one sCCE. The sREG #m included in the sCCE #n satisfies $n=\lfloor m/N_{sREG}^{sCCE} \rfloor$, or the index of the sREG included in the sCCE #n is $j+n N_{sREG}^{sCCE}$, where $j=0, 1, \ldots, N_{sREG}^{sCCE}-1$ and $n=0, 1, \ldots, N_{sCCE}^{X_m}-1$.

In the case of the distributed mapping, a principle is satisfied: a group of sREGs discrete at equal intervals in the frequency domain in the single symbol constitute one sCCE. The sREG #m included in the sCCE #n satisfies at least one of formulas described below.

$$n = (\lfloor N_{sREG}/N_{sREG}^{sCCE} \rfloor / N_{OFDM}) \left\lfloor \frac{m}{(N_{sREG}/N_{OFDM})} \right\rfloor + m \bmod (\lfloor N_{sREG}/N_{sREG}^{sCCE} \rfloor / N_{OFDM}). \quad \text{Formula 1}$$

$$n = \left( \frac{N_{sREG}}{N_{sREG}^{sCCE} \cdot N_{OFDM}} \right) \left\lfloor \frac{m}{(N_{sREG}/N_{OFDM})} \right\rfloor + m \bmod \left( \frac{N_{sREG}}{N_{sREG}^{sCCE} \cdot N_{OFDM}} \right). \quad \text{Formula 2}$$

When $n \leq \lfloor N_{sREG}/N_{sREG}^{sCCE} \rfloor/2$, $\quad$ Formula 3

$n = m \bmod (\lfloor N_{sREG}/N_{sREG}^{sCCE} \rfloor/N_{OFDM})$, where $m \leq N_{sREG}/N_{OFDM}$;

When $n > \lfloor N_{sREG}/N_{sREG}^{sCCE} \rfloor/2$, $n - \lfloor N_{sREG}/N_{sREG}^{sCCE} \rfloor/2 = (m - N_{sREG}/N_{OFDM}) \bmod (\lfloor N_{sREG}/N_{sREG}^{sCCE} \rfloor/N_{OFDM})$, where $m > N_{sREG}/N_{OFDM}$.

$$n = (\lfloor N_{sREG}/N_{sREG}^{sCCE} \rfloor) \left\lfloor \frac{m}{N_{sREG}} \right\rfloor + m \bmod (\lfloor N_{sREG}/N_{sREG}^{sCCE} \rfloor). \quad \text{Formula 4}$$

$$n = (N_{sREG}/N_{sREG}^{sCCE}) \left\lfloor \frac{m}{N_{sREG}} \right\rfloor + m \bmod (N_{sREG}/N_{sREG}^{sCCE}). \quad \text{Formula 5}$$

$$n = (\lfloor N_{sREG}/N_{sREG}^{sCCE} \rfloor/2) \left\lfloor \frac{m}{(N_{sREG}/2)} \right\rfloor + m \bmod (\lfloor N_{sREG}/N_{sREG}^{sCCE} \rfloor/2). \quad \text{Formula 6}$$

$$n = \left( \frac{N_{sREG}}{2N_{sREG}^{sCCE}} \right) \left\lfloor \frac{m}{N_{sREG}/2} \right\rfloor + m \bmod \left( \frac{N_{sREG}}{2N_{sREG}^{sCCE}} \right). \quad \text{Formula 7}$$

$$n = (\lfloor N_{PRB}/N_{sREG}^{sCCE} \rfloor) \left\lfloor \frac{m}{N_{PRB}} \right\rfloor + m \bmod (\lfloor N_{PRB}/N_{sREG}^{sCCE} \rfloor). \quad \text{Formula 8}$$

-continued $$n = (N_{PRB}/N_{sREG}^{sCCE}) \left\lfloor \frac{m}{N_{PRB}} \right\rfloor + m \bmod (N_{PRB}/N_{sREG}^{sCCE}). \quad \text{Formula 9}$$

Alternatively, the index of the sREG included in the sCCE #n satisfies at least one of formulas described below.

$$(n+j) \lfloor N_{PRB}/N_{sREG}^{sCCE} \rfloor, \text{ where} \quad \text{Formula 1}$$

$j = 0, 1, \ldots, N_{sREG}^{sCCE} - 1$ and $$n = 0, 1, \ldots, N_{sCCE}^{X_m} - 1.$$

$$(n+j)(N_{PRB}/N_{sREG}^{sCCE}), \text{ where} \quad \text{Formula 2}$$

$j = 0, 1, \ldots, N_{sREG}^{sCCE} - 1$ and $n = 0, 1, \ldots, N_{sCCE}^{X_m} - 1$.

$$n \bmod \left\lfloor \frac{N_{sREG}^{symb}}{N_{sREG}^{sCCE}} \right\rfloor + \left\lfloor \frac{n}{\left\lfloor \frac{N_{sREG}^{symb}}{N_{sREG}^{sCCE}} \right\rfloor} \right\rfloor \cdot N_{sREG}^{symb} + i \cdot \left\lfloor \frac{N_{sREG}^{symb}}{N_{sREG}^{sCCE}} \right\rfloor; \quad \text{Formula 3}$$

where $n=0, \ldots, N_{sCCE,p}-1$, $N_{sCCE,p}$ denotes the number of sCCEs in a control channel RB set p, $i=0, \ldots, N_{sREG}^{sCCE}-1$, $N_{sREG}^{sCCE}$ denotes the number of sREGs included in each sCCE, and $N_{sREG}^{symb}$ denotes the number of sREGs included in each OFDM symbol in the control channel RB set p. Since one sREG is one RB in one OFDM symbol, $N_{sREG}^{symb}=N_{PRB}$. The formula 3 is applicable to any value of the number of RBs in the RB set. It is to be particularly noted that an intermediate term in the formula 3 cannot be written as $$\left\lfloor \frac{n \cdot N_{sREG}^{sCCE}}{N_{sREG}^{symb}} \right\rfloor \cdot N_{sREG}^{symb}.$$

The reason is that: in a case where the number of RBs in the RB set is not an integer multiple of $N_{sREG}^{sCCE}$, the use of $$n \bmod \left\lfloor \frac{N_{sREG}^{symb}}{N_{sREG}^{sCCE}} \right\rfloor + \left\lfloor \frac{n \cdot N_{sREG}^{sCCE}}{N_{sREG}^{symb}} \right\rfloor \cdot N_{sREG}^{symb} + i \cdot \left\lfloor \frac{N_{sREG}^{symb}}{N_{sREG}^{sCCE}} \right\rfloor$$

will make an sCCE that should be mapped onto the second symbol be still mapped onto the first symbol, and then make two sCCEs with different indexes correspond to the same sREGs, resulting in ambiguity and misunderstanding. For example: when $N_{PRB}=18$ PRBs, $N_{OFDM}=2$, $N_{sREG}^{sCCE}=4$, the sREGs when n=4 are the same as the sREGs when n=0, which are sREGs #0, #4, #8 and #12. However, the formula 3 will not cause that ambiguity and misunderstanding. The sREGs when n=0 are sREGs #0, #4 #,8 and #12, and the sREGs when n=4 are sREGs #18, #22, #26 and #30.

$$n \bmod \left( \frac{N_{sREG}^{symb}}{N_{sREG}^{sCCE}} \right) + \left\lfloor \frac{n \cdot N_{sREG}^{sCCE}}{N_{sREG}^{symb}} \right\rfloor \cdot N_{sREG}^{symb} + i \cdot \left( \frac{N_{sREG}^{symb}}{N_{sREG}^{sCCE}} \right); \quad \text{Formula 4}$$

where $n=0, \ldots, N_{sCCE,p}-1$, $N_{sCCE,p}$ denotes the number of sCCEs in the control channel RB set p, $i=0, \ldots, N_{sREG}^{sCCE}-1$, $N_{sREG}^{sCCE}$ denotes the number of sREGs included in each sCCE, and $N_{sREG}^{symb}$ denotes the number of sREGs included in each OFDM symbol in the control channel RB set p. Since one sREG is one RB in one OFDM symbol, $N_{sREG}^{symb}=N_{PRB}$. The formula 4 is only applicable to the case where the number of RBs in the RB set is an integer multiple of $N_{sREG}^{sCCE}$.

Taking $N_{OFDM}=2$ and $N_{sREG}^{sCCE}=4$ as an example, when $N_{PRB}=16$ PRBs, a schematic diagram of the centralized mapping and the distributed mapping is shown in FIG. 8.

In the case of the distributed mapping, a principle is satisfied: sREGs are selected at equal intervals from all the numbered sREGs to constitute one sCCE. The sREG #m included in the sCCE #n satisfies $$n = m\mathrm{mod}(N_{sREG}/N_{sREG}^{sCCE}) \text{ or}$$

$$n = m\mathrm{mod}\left(\frac{N_{PRB}\cdot N_{OFDM}}{N_{sREG}^{sCCE}}\right);$$

or the index of the sREG included in the sCCE #n is $$(n+j)\left(\frac{N_{PRB}\cdot N_{OFDM}}{N_{sREG}^{sCCE}}\right) \text{ or } (n+j)\left\lfloor\frac{N_{PRB}\cdot N_{OFDM}}{N_{sREG}^{sCCE}}\right\rfloor,$$

where $j=0, 1, \ldots, N_{sREG}^{sCCE}-1$ and $n=0, 1, \ldots, N_{sCCE}^{X_m}-1$.

Meanwhile, when a mapping between a CCE and REGs is the centralized mapping, the group of REGs continuous in the frequency domain in the single symbol constitute the CCE. And to avoid that REGs used at a high aggregation level completely includes REGs used at a low aggregation level to result in a misunderstanding between different aggregation levels, an aggregation level is indicated using an interleaving method or physical layer signaling, or different aggregation levels of information are differently scrambled. It is to be illustrated that, in the case of the sPDCCH, the CCE is replaced with the sCCE, and the REG is replaced with the sREG.

When an aggregation level L is indicated via the physical layer signaling, that is, the used aggregation level is directly indicated in the DCI, for example, 2 bit are used for indicating one of L=1, 2, 4 and 8 for the terminal verifying, thereby avoiding the misunderstanding between different aggregation levels.

The different aggregation levels of information are differently scrambled. One application method is: for different aggregation levels, to scramble cyclic redundancy checks (CRCs) with different masks, for example, scrambling with <0, 0, 0, 0, 0, 0, 0, 0, 0, 0, 0, 0, 0, 0, 0, 0>, <0, 0, 0, 0, 0, 0, 0, 0, 0, 0, 0, 0, 0, 0, 0, 1>, <0, 0, 0, 0, 0, 0, 0, 0, 0, 0, 0, 0, 0, 1, 0> and <0, 0, 0, 0, 0, 0, 0, 0, 0, 0, 0, 0, 0, 1, 1> respectively for L=1, 2, 4 and 8. Another application method is to scramble information about DCI and CRC, or information obtained after encoding DCI and CRC, or information subject to rate matching with a scrambling code sequence, for example, $\tilde{b}(i)=(b(i)+c(i))\mathrm{mod}\ 2$, where b(i) is pre-scrambling information, and c(i) is the scrambling code sequence (such as a scrambling code sequence generated by using a pseudo-random sequence of a Gold sequence of length 31 in the LTE system). An initial value of the scrambling code sequence is distinguished using different aggregation levels (for example, $c_{init}=L$).

For adopting the interleaving method, indexes of REGs included in a candidate set with an aggregation level L are sequentially written into an interleaver and read out from the interleaver according to a column permutation pattern, and then nulls are deleted after reading. The index of a REG greater than X is defined as a null element.

L=1, 2, 4 or 8.

X=L·M−1, and M denotes the number of REGs included in each CCE.

The column permutation pattern includes at least one of: <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>, or <0, 4, 8, 12, 16, 20, 24, 28, 1, 5, 9, 13, 17, 21, 25, 29, 2, 6, 10, 14, 18, 22, 26, 30, 3, 7, 11, 15, 19, 23, 27, 31>.

Taking L=2 and M=4 as an example, in a case where the column permutation pattern is <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>, the REGs #0 to #7 are sequentially written in and read out, and the index of the REG greater than 7 is considered as the <NULL> element. That is, after the null elements are deleted, the indexes of REGs are 1, 5, 3, 7, 0, 4, 2, 6, which means that a first CCE, i.e., CCE #0, in the candidate set with L=2 includes REGs #1, #5, #3 and #7, and the CCE #0 when L=1 includes REGs #1, #3, #0 and #2. At this time, the REG resource used at the high aggregation level does not completely include the REG resource used at the low aggregation level, and the misunderstanding between different aggregation levels will not be caused.

Similarly, for the column permutation pattern <0, 4, 8, 12, 16, 20, 24, 28, 1, 5, 9, 13, 17, 21, 25, 29, 2, 6, 10, 14, 18, 22, 26, 30, 3, 7, 11, 15, 19, 23, 27, 31>, the REGs #0 to #7 are sequentially written in and read out. The index of the REG greater than 7 is considered as the <NULL> element. That is, after the null elements are deleted, the indexes of REGs are 0, 4, 1, 5, 2, 6, 3, 7, which means that the first CCE, CCE #0, in the candidate set with L=2 includes REGs #0, #4, #1 and #5, and the CCE #0 when L=1 includes REGs #0, #1, #2 and #3. At this time, the REG resource used at the high aggregation level does not completely include the REG resource used at the low aggregation level, and the misunderstanding between different aggregation levels will not be caused.

Through the technical solutions in the application embodiment three, the REGs corresponding to the CCE used by a downlink control channel may be determined in the single TTI scheduling or the multi-TTI scheduling, so that the terminal and the base station may accurately acquire a specific control resource position. The scheme in the present application may maximize performance gains of centralized transmissions and distributed transmissions respectively.

Application Embodiment Four

A base station activates a terminal A to perform an SPS transmission with a preformed period. For example, the TTI includes the small number of OFDM symbols, for example, not more than 7 OFDM symbols, but it is not limited thereto. This embodiment describes a short structure in a Long-Term Evolution (LTE) system. That is, the TTI may be understood as an sTTI, but it is not limited thereto. A frame structure of a downlink (DL) short TTI is shown in FIG. 5. A subframe of 1 ms includes 6 DL sTTIs. When an sPDSCH is configured to start from an OFDM symbol #1 or #3, a pattern 1 is used. When the sPDSCH is configured to start from an OFDM symbol #2, a pattern 2 is used. It should be illustrated that the OFDM symbols are numbered from 0, that is, 14 OFDM symbols in the subframe of 1 ms are sequentially numbered #0 to #13. A frame structure for an uplink (UL) short TTI is shown in FIG. 6. The subframe of 1 ms includes 6 UL sTTIs. It should be illustrated that the OFDM symbols are numbered from 0, that is, 14 OFDM symbols in the subframe of 1 ms are sequentially numbered #0 to #13.

DCI for scheduling sTTIs SPS may be transmitted in any DL sTTI. When the DCI is in a DL sTTI #0, the DCI is carried in a PDCCH. When the DCI is in DL sTTIs #1 to #5, the DCI is carried in an sPDCCH. Alternatively, the DCI for scheduling the sTTIs SPS may be transmitted in part of the sTTIs, for example, the DCI is only transmitted in the DL sTTI #0, or in the DL sTTIs #0 and #3.

In a case of scheduling the sTTIs SPS transmission, a minimum period is one sTTI. If a reference signal density is not considered to be reduced, each sTTI includes a reference signal. If the reference signal density is considered to be reduced, at least one of each N sTTIs includes the reference signal. A value of N is determined in a predefined manner, or configured via high-layer signaling. For example, N=2, 3 or 6.

When an SPS downlink transmission with a period of one sTTI is activated, in a transmission of each N DL sTTIs, a position of a demodulation reference signal (DMRS), which may be understood as the reference signal in the embodiments described above, is determined in at least one of manners described below. It is to be illustrated that though the downlink transmission is taken as an example for description in this example, a manner for determining the position of the DMRS is not only used for the downlink transmission but also used for the uplink transmission. This example describes a scenario where a time domain position of the DMRS is fixed in the TTIs.

In a manner one, it is predefined that, in each N TTIs, the reference signal only exists in a first TTI and does not exist in the rest of each N TTIs. For this case, no additional indication is required. A first PDSCH for activating the SPS transmission includes the DMRS, and only the first sTTI among each N sTTIs includes the DMRS.

In a manner two, 1-bit signaling is used for indicating whether a pilot density is reduced in each N TTIs. The signaling may be high-layer signaling or physical layer signaling. When the physical layer signaling reuses the single sTTI scheduling, 1 bit indicates whether the DMRS exists or not. Not reducing the pilot density means that all of the N TTIs include the reference signal, and reducing the pilot density means that the number of TTIs including the reference signal is less than N. The pilot density is reduced in at least one of the following manners: only the first TTI includes the reference signal; only the first TTI and the last TTI include the reference signal; or only the first TTI and a TTI with an offset of x TTIs from the first TTI include the reference signal, where x may be, for example, 1, 2, N/2, N−1 or N.

In a manner three, a reference signal pattern in each N TTIs is indicated via the signaling. The reference signal pattern is shown in table 7. Note: R represents that the sTTI includes the RS, and D represents that the sTTI includes no RS. If N=2, 1 bit is used for indicating that the pattern is RR or RD. If N=3, 2 bits are used for indicating that the pattern is RRR, RDD, RDR or DRD. If N=6, 2 bits are used for indicating RRRRRR, RDRDRD, RDDRDD or RDRRDR. For example, when N=3, the pattern is aligned with a boundary of a slot. For example, when N=6, the pattern is aligned with a boundary of a subframe.

TABLE 7

| Pilot pattern in each N sTTIs | | |
| --- | --- | --- |
| N = 2 | N = 3 | N = 6 |
| RR | RRR | RRRRRR |
| RD | RDD | RDRDRD |
|  | RDR | RDDRDD |
|  | DRD | RDRRDR |

In this case, when among a group of N sTTIs, there is no data transmitted in the first sTTI and there is data transmitted in the subsequent sTTI(s), how to use the reference signal may be determined in at least one of the following manners: (1) the reference signal to be used is a DMRS received in a last time; (2) the DMRS is still transmitted when no data is transmitted; (3) the reference signal is delaying to a next sTTI including the DMRS to be transmitted. At the manner (3), when N=2, only one sTTI needs to be delayed and the latter sTTI is the sTTI including the DMRS.

When activating an SPS uplink transmission with the period of one sTTI, in a transmission of each N UL sTTIs, the position of the DMRS which may be understood as the reference signal in the embodiments described above is determined in at least one manner described below. It is to be illustrated that though the uplink transmission is taken as an example for description in this example, a manner for determining the position of the DMRS is not only used for the uplink transmission but also used for the downlink transmission. This example describes a scenario where the time domain position of the DMRS is unfixed in the TTIs.

In a manner one, it is predefined that, in each N TTIs, all of the N TTIs include the reference signal, and an application manner is that: only a first OFDM symbol in each TTI includes the reference signal. The manner one does not reduce the reference signal density and predefines a symbol where the reference signal is located in each sTTI.

In a manner two, it is predefined that, in each N TTIs, the reference signal only exists in the first TTI, an application manner is that: only the first OFDM symbol in the first TTI includes the reference signal, and there is no reference signal in the remaining TTIs except for the first TTI. No additional indication is required. A first PUSCH for activating the SPS transmission includes the DMRS, and only the first sTTI among each N sTTIs includes the DMRS.

In a manner three, 1-bit signaling is used for indicating whether the reference signal density is reduced in each N TTIs. The signaling may be the high-layer signaling or the physical layer signaling. When the physical layer signaling reuses the single sTTI scheduling, 2 bits indicate a DMRS position. Not reducing the reference signal density means that all of the N TTIs include the reference signal, and an application manner is that: only the first OFDM symbol in each TTI includes the reference signal. Reducing the reference signal density means that the number of TTIs including the reference signal is less than N, and an application manner is that: in the TTIs including the reference signal, only the first OFDM symbol in each TTI includes the reference signal. The reference signal density is reduced in at least one of the following manners: only the first TTI includes the reference signal; only the first TTI and the last TTI include the reference signal; or only the first TTI and the TTI with the offset of x TTIs from the first TTI include the reference signal, where x may be, for example, 1, 2, N/2, N−1 or N.

In a manner four, reference signal patterns in each N TTIs is indicated via the signaling. The reference signal patterns are shown in table 8. Note: R represents that the OFDM symbol includes the DMRS, and D represents that the OFDM symbol includes no DMRS. Note: For 3OS, DR corresponds to DDR, and RD corresponds to RDD. If N=2, 2 bits are used for indicating that the pattern is RD|RD, RD|DD, DR|DD or DD|RD. If N=3, 2 bits are used for indicating that the pattern is RD|RD|RD, RD|DD|DD, RD|DD|RD or DD|RD|DD. If N=6, 2 bits are used for indicating RD|RD|RD|RD|RD|RD, RD|DD|RD|DD|RD|DD, RD|DD|DD|RD|DD|DD or DD|RD|DD|DD|RD|DD. For example, when N=3, the pattern is aligned with the boundary of the slot. For example, when N=6, the pattern is aligned with the boundary of the subframe.

TABLE 8

Reference signal pattern in each N sTTIs

| N = 2 | N = 3 | N = 6 |
|---|---|---|
| RD\|RD | RD\|RD\|RD | RD\|RD\|RD\|RD\|RD\|RD |
| RD\|DD | RD\|DD\|DD | RD\|DD\|RD\|DD\|RD\|DD |
| DR\|DD | RD\|DD\|RD | RD\|DD\|DD\|RD\|DD\|DD |
| DD\|RD | DD\|RD\|DD | DD\|RD\|DD\|DD\|RD\|DD |

Note: | denotes the boundary of an sTTI n.

In this case, when no data is transmitted in the first sTTI and the data is transmitted in the subsequent sTTI(s) among a group of N sTTIs, how to use the reference signal may be determined in at least one of the following manners: (1) the reference signal to be used is the DMRS received in the last time; (2) the DMRS is still transmitted when no data is transmitted; (3) the reference signal is delayed to be transmitted in the next sTTI including the DMRS. In the manner (3), when N=2, only one sTTI needs to be delayed and the latter sTTI is the sTTI including the DMRS.

In an embodiment, a TTI where a first traffic transmission for activating the SPS transmission is performed includes the reference signal.

In an embodiment, when the signaling is the physical layer signaling, the signaling is only valid for the period of one TTI and is not used for validation of an activation or a deactivation of the SPS transmission, and all bits corresponding to the signaling are set to 0 for other periods and used for validation of the activation or the deactivation of the SPS transmission; or the signaling has different meanings for the period of one TTI and the other periods (the signaling is valid for the period of one TTI and is used for a reference signal indication in the each N TTIs, and the signaling is used for the reference signal indication in a single TTI for the other periods).

Through the schemes provided by this application embodiment, when scheduling implements in the sTTIs, a DMRS overhead may be saved, and fewer indication overheads are required to indicate that one or more sTTIs include the DMRS, so that the schemes are applicable to a medium-low speed moving scenario and a high-speed moving scenario. Meanwhile, after reference signal overheads are saved, more resources may be used for data transmission, thereby improving a spectral efficiency of a system.

Application Embodiment Five

A base station configures a terminal A to perform a SPS transmission with a period of one TTI. For example, the TTI includes a small number of OFDM symbols, for example, not more than 7 OFDM symbols, but it is not limited thereto.

This embodiment describes a structure of a short TTI (sTTI) in a Long-Term Evolution (LTE) system. That is, the TTI may be understood as an sTTI, but it is not limited thereto. The TTI may also be applied to a 5G new radio (NR) system. It is to be illustrated that when LTE is taken as an example in this embodiment, one slot includes 7 OFDM symbols and has a duration of 0.5 ms; when NR is taken as an example, one slot includes 14 OFDM symbols and has a duration of 1 ms for a subcarrier spacing of 15 kHz. A frame structure of a downlink (DL) short TTI is shown in FIG. 5. A subframe of 1 ms includes 6 DL sTTIs. When an sPDSCH is configured to start from an OFDM symbol #1 or #3, a pattern 1 is used. When the sPDSCH is configured to start from an OFDM symbol #2, a pattern 2 is used. It should be illustrated that the OFDM symbols are numbered from 0, that is, 14 OFDM symbols in the subframe of 1 ms are sequentially numbered #0 to #13. A frame structure for an uplink (UL) short TTI is shown in FIG. 6. The subframe of 1 ms includes 6 UL sTTIs. It should be illustrated that the OFDM symbols are numbered from 0, that is, the 14 OFDM symbols in the subframe of 1 ms are sequentially numbered #0 to #13.

In a scenario one, DCI for scheduling and activating the sTTIs SPS may be transmitted in any DL sTTI. When the DCI is in a DL sTTI #0, the DCI is carried in a PDCCH. When the DCI is in DL sTTIs #1 to #5, the DCI is carried in an sPDCCH. In this scenario, an sTTI length is set to ⅔ OS or 1 slot through radio resource control (RRC), and an sTTI SPS period is configured through the RRC. The sTTI length and the sTTI SPS period are configured separately. Alternatively, the sTTI length and the sTTI SPS period are configured through the RRC by the joint encoding. That is, when an SPS period is set to 1 sTTI, the corresponding sTTI length is also indicated. For example, as shown in table 9, states 0 and 1 both indicate an SPS period of 1 sTTI, but correspond to different sTTI lengths. For example, in an NR example shown in table 10, a traffic duration (a time domain length) and the SPS period are jointly indicated. It should be illustrated that indications through the joint encoding in tables 9 and 10 are only examples, and the states therein are also only examples, but it is not limited thereto. In this embodiment, OS is short for an OFDM symbol.

TABLE 9 sTTI SPS period and sTTI length indicated through the joint encoding

| State | sTTI SPS Period and sTTI Length |
|---|---|
| 0 | 1 sTTI with a length of 2/3 OS |
| 1 | 1 sTTI with a length of 1 slot |
| 2 | 2 sTTI each with the length of 2/3 OS |
| 3 | 2 sTTI each with the length of 2/3 OS |
| 4 | 3 sTTI each with the length of 2/3 OS |
| 5 | 4 sTTI each with the length of 2/3 OS |
| 6 | 5 sTTI each with the length of 2/3 OS |
| 7 | 1 ms (1 subframe) and an sTTI length of 2/3 OS |
| 8 | 1 ms (1 subframe) and an sTTI length of 1 slot |
| 9 | 2 ms (2 subframes) and an sTTI length of 2/3 OS |
| 10 | 2 ms (2 subframes) and an sTTI length of 1 slot |
| 11 | 5 ms (5 subframes) and an sTTI length of 2/3 OS |
| 12 | 5 ms (5 subframes) and an sTTI length of 1 slot |
| 13 | Spare |
| 14 | Spare |
| 15 | Spare |

TABLE 10 sTTI SPS period and traffic duration indicated through the joint encoding

| State | SPS Period and Traffic Duration |
|---|---|
| 0 | 1 traffic duration with a length of 2 OS |
| 1 | 1 traffic duration with a length of 7 OS |
| 2 | 2 traffic durations each with the length of 2 OS |
| 3 | 3 traffic durations each with the length of 2 OS |
| 4 | 1 slot and a traffic duration of 2 OS |
| 5 | 1 slot and a traffic duration of 7 OS |
| 6 | 2 slots and a traffic duration of 2 OS |
| 7 | 2 slots and a traffic duration of 7 OS |

In a scenario two, the DCI for scheduling and activating the sTTIs SPS may be transmitted in part of the sTTIs, for example, the DCI is only transmitted in the DL sTTI #0. Alternatively, the DCI for scheduling the sTTI SPS may transmitted only in a first mini-slot in a slot (including 14 OFDM symbols) of an NR or there is only one opportunity to trigger a control channel.

When the DCI is only transmitted in the sTTI #0, the DCI is carried in the PDCCH. When both the sTTI SPS period and an offset are configured through the RRC, the sTTI length may be separately configured with the sTTI SPS period and the offset, or may be jointly encoded with the sTTI SPS period and the offset.

When the sTTI length is separately configured with the sTTI SPS period and the offset, the sTTI length is set to ⅔ OS or 1 slot through the RRC, and the sTTI SPS period and the offset are configured through the RRC. For example, as shown in table 11, it is to be illustrated that only an offset in the subframe of 1 ms needs to be considered for any period when the period is greater than 1 ms. Table 11 shows a configuration for ⅔ OS, table 12 shows a configuration for 1 slot, table 13 shows a configuration for the traffic duration of 2 OS in the NR, and table 14 shows a configuration for the traffic duration of 7 OS. In conclusion, for a determined sTTI length or traffic duration, the number of values of the offset for each period is as follows: for an SPS period less than 1 ms, the number of values of the offset is the number of sTTIs or traffic durations included in the SPS period; for an SPS period greater than 1 ms, the number of values of the offset is the number of sTTIs or traffic durations in 1 ms.

TABLE 11 sTTI SPS period and offset

| Index I_sps | sTTI SPS Period | Offset |
|---|---|---|
| 0 | 1sTTI | I_sps |
| 1-2 | 2sTTI | I_sps-1 |
| 3-5 | 3sTTI | I_sps-3 |
| 6-9 | 4sTTI | I_sps-6 |
| 10-14 | 5sTTI | I_sps-10 |
| 15-20 | 1 ms | I_sps-15 |
| 21-26 | 2 ms | I_sps-21 |
| 27-32 | 3 ms | I_sps-27 |
| ... | ... | ... |

TABLE 12 sTTI SPS period and offset

| Index I_sps | sTTI SPS Period | Offset |
|---|---|---|
| 0 | 1sTTI | I_sps |
| 1-2 | 1 ms | I_sps-1 |
| 3-4 | 2 ms | I_sps-3 |
| 5-6 | 3 ms | I_sps-5 |
| ... | ... | ... |

TABLE 13

SPS period and offset

| Index I_sps | SPS Period | Offset |
|---|---|---|
| 0 | 1 traffic duration | I_sps |
| 1-2 | 2 traffic durations | I_sps-1 |
| 3-5 | 3 traffic durations | I_sps-3 |
| 6-9 | 4 traffic durations | I_sps-6 |
| 10-14 | 5 traffic durations | I_sps-10 |
| 15-20 | 6 traffic durations | I_sps-15 |
| 21-27 | 1 ms | I_sps-21 |
| 28-34 | 2 ms | I_sps-28 |
| 35-41 | 3 ms | I_sps-35 |
| ... | ... | ... |

TABLE 14

SPS period and offset

| Index I_sps | SPS Period | Offset |
|---|---|---|
| 0 | 1 traffic duration | I_sps |
| 1-2 | 1 ms | I_sps-1 |
| 3-4 | 2 ms | I_sps-3 |
| 5-6 | 3 ms | I_sps-5 |
| ... | ... | ... |

When the sTTI length is jointly encoded with the sTTI SPS period and the offset, configuring the sTTI length of ⅔ OS or 1 slot, the sTTI SPS period and the offset is performed through the RRC, as shown in table 15. In the NR example shown in table 16, the traffic duration of 2 OS and the traffic duration of 7 OS are taken as examples. It is to be illustrated that only the offset in the subframe of 1 ms needs to be considered for any period and any sTTI length when the period is greater than 1 ms. In conclusion, the number of values of the offset for each period is as follows: for the SPS period less than 1 ms, the number of values of the offset is the number of sTTIs or traffic durations included in the SPS period; for the SPS period greater than 1 ms, the number of values of the offset is the number of sTTIs or traffic durations in one subframe.

TABLE 15 sTTI SPS period, offset and sTTI length

| Index I_sps | sTTI Length | sTTI SPS Period | Offset |
|---|---|---|---|
| 0 | 2/3 OS | 1 sTTI | I_sps |
| 1 | 1 slot | 1 sTTI | I_sps-1 |
| 2-3 | 2/3 OS | 2 sTTIs | I_sps-2 |
| 4-6 | 2/3 OS | 3 sTTIs | I_sps-4 |
| 7-10 | 2/3 OS | 4 sTTIs | I_sps-7 |
| 11-15 | 2/3 OS | 5 sTTIs | I_sps-11 |
| 16-21 | 2/3 OS | 1 ms | I_sps-16 |
| 22-23 | 1 slot | 1 ms | I_sps-22 |

TABLE 15-continued sTTI SPS period, offset and sTTI length

| Index I_sps | sTTI Length | sTTI SPS Period | Offset |
|---|---|---|---|
| 24-29 | 2/3 OS | 2 ms | I_sps-24 |
| 30-31 | 1 slot | 2 ms | I_sps-30 |
| ... | | ... | ... |

TABLE 16

SPS period, offset and traffic duration

| Index I_sps | Traffic Duration | SPS Period | Offset |
|---|---|---|---|
| 0 | 2 OS | 1 traffic duration | I_sps |
| 1 | 7 OS | 1 traffic duration | I_sps-1 |
| 2-3 | 2 OS | 2 traffic durations | I_sps-2 |
| 4-6 | 2 OS | 3 traffic durations | I_sps-4 |
| 7-10 | 2 OS | 4 traffic durations | I_sps-7 |
| 11-15 | 2 OS | 5 traffic durations | I_sps-11 |
| 16-21 | 2 OS | 6 traffic durations | I_sps-16 |
| 22-28 | 2 OS | 1 ms | I_sps-22 |
| 29-30 | 7 OS | 1 ms | I_sps-29 |
| 31-37 | 2 OS | 2 ms | I_sps-31 |
| 38-39 | 7 OS | 2 ms | I_sps-38 |
| ... | | ... | ... |

When the sTTI SPS period is configured through the RRC, the sTTI length and an SPS offset are indicated in the DCI through the joint encoding. The sTTI in the LTE is shown in table 17. The sTTI in the NR is shown in table 18. Values in the tables are only illustrative and it is not limited thereto.

TABLE 17 sTTI length and SPS offset

| Index | sTTI Length and SPS Offset |
|---|---|
| 0 | The length of 2/3 OS and an offset of 0 sTTIs |
| 1 | The length of 2/3 OS and an offset of 1 sTTI |
| 2 | The length of 2/3 OS and an offset of 2 sTTIs |
| 3 | The length of 2/3 OS and an offset of 3 sTTIs |
| 4 | The length of 2/3 OS and an offset of 4 sTTIs |
| 5 | The length of 2/3 OS and an offset of 5 sTTIs |
| 6 | The length of 1 slot and the offset of 0 sTTIs |
| 7 | The length of 1 slot and the offset of 1 sTTI |

TABLE 18

Traffic duration and SPS offset

| Index | Traffic Duration and SPS Offset |
|---|---|
| 0 | The traffic duration of 2 OS and an offset of 0 OS |
| 1 | The traffic duration of 2 OS and an offset of 2 OS |
| 2 | The traffic duration of 2 OS and an offset of 4 OS |
| 3 | The traffic duration of 2 OS and an offset of 7 OS |
| 4 | A traffic duration of 4 OS and the offset of 0 OS |
| 5 | The traffic duration of 4 OS and the offset of 7 OS |
| 6 | The traffic duration of 7 OS and the offset of 0 OS |
| 7 | The traffic duration of 7 OS and the offset of 7 OS |

In a scenario three, the DCI is not activated to trigger the SPS transmission, that is, the SPS transmission is completely configured through the RRC, which is also referred to as a grant-free transmission. In the scenario three, the SPS period, the offset and the traffic time domain length may be respectively configured or jointly encoded.

When the SPS period, the offset and the traffic duration are respectively configured, the traffic duration is configured via RRC signaling, and the SPS period and the offset are configured via the RRC signaling. The traffic duration may be at least one of 2 OS, 4 OS and 7 OS. A principle is that: for the determined sTTI length or traffic duration, the number of values of the offset for each period is the number of sTTIs or traffic durations included in the SPS period. In this case, table 19 shows configurations of the SPS period and the offset by taking 7 OS as an example. Alternatively, a principle is that: for the determined sTTI length or traffic duration, the number of values of the offset for each period is less than or equal to the number of sTTIs or traffic durations included in the SPS period. In this case, table 20 shows configurations of the SPS period and the offset by taking 7 OS as an example. It should be illustrated that values in the tables are only illustrative and it is not limited thereto.

TABLE 19

SPS period and offset

| Index I_sps | SPS Period | Offset |
|---|---|---|
| 0 | 1 traffic duration | I_sps |
| 1-2 | 1 ms | I_sps-1 |
| 3-6 | 2 ms | I_sps-3 |
| 7-12 | 3 ms | I_sps-7 |
| ... | ... | ... |

TABLE 20

SPS period and offset

| Index I_sps | SPS Period | Offset |
|---|---|---|
| 0 | 1 traffic duration | I_sps |
| 1-2 | 1 ms | I_sps-1 |
| 3-4 | 2 ms | I_sps-3 |
| 5-6 | 3 ms | I_sps-5 |
| ... | ... | ... |

When the SPS period, the offset and the traffic duration are jointly encoded, the traffic duration, the SPS period and the offset are configured via the RRC signaling. The traffic duration of 2 OS and the traffic duration of 7 OS are taken as examples for description, but it is not limited thereto. A principle is that: the number of values of the offset for each period is the number of sTTIs or traffic durations included in the SPS period, as shown in table 21. Alternatively, the principle is that the number of values of the offset for each period is less than or equal to the number of sTTIs or traffic durations included in the SPS period, as shown in table 22. It should be illustrated that values in the tables are only illustrative and it is not limited thereto.

TABLE 21

SPS period, offset and traffic duration

| Index I_sps | Traffic Duration | SPS Period | Offset |
|---|---|---|---|
| 0 | 2 OS | 1 traffic duration | I_sps |
| 1 | 7 OS | 1 traffic duration | I_sps-1 |
| 2-3 | 2 OS | 2 traffic durations | I_sps-2 |
| 4-6 | 2 OS | 3 traffic durations | I_sps-4 |
| 7-10 | 2 OS | 4 traffic durations | I_sps-7 |
| 11-15 | 2 OS | 5 traffic durations | I_sps-11 |
| 16-21 | 2 OS | 6 traffic durations | I_sps-16 |
| 22-28 | 2 OS | 1 ms | I_sps-22 |
| 29-30 | 7 OS | 1 ms | I_sps-29 |
| 31-44 | 2 OS | 2 ms | I_sps-31 |
| 45-48 | 7 OS | 2 ms | I_sps-45 |
| ... | | ... | ... |

TABLE 22

SPS period, offset and traffic duration

| Index I_sps | Traffic Duration | SPS Period | Offset |
|---|---|---|---|
| 0 | 2 OS | 1 traffic duration | I_sps |
| 1 | 7 OS | 1 traffic duration | I_sps-1 |
| 2-3 | 2 OS | 2 traffic durations | I_sps-2 |
| 4-6 | 2 OS | 3 traffic durations | I_sps-4 |
| 7-10 | 2 OS | 4 traffic durations | I_sps-7 |
| 11-15 | 2 OS | 5 traffic durations | I_sps-11 |
| 16-21 | 2 OS | 6 traffic durations | I_sps-16 |
| 22-28 | 2 OS | 1 ms | I_sps-22 |
| 29-30 | 7 OS | 1 ms | I_sps-29 |
| 31-37 | 2 OS | 2 ms | I_sps-31 |
| 38-39 | 7 OS | 2 ms | I_sps-38 |
| ... | | ... | ... |

Through the schemes provided by this application embodiment, the SPS period, the offset and the traffic duration may be flexibly determined in various manners during the sTTI SPS transmission or the SPS transmission using a short traffic duration in the NR, saving physical layer signaling overheads or high-layer signaling overheads.

Embodiment Nine

An embodiment of the present application further provides a storage medium. The storage medium includes stored programs which, when executed, execute the method according to any embodiment described above.

In an embodiment, the storage medium of this embodiment may be configured to store program codes for executing step S1.

In step S1, it is indicated, in a preset manner, that a reference signal exists in at least one of N scheduled transmission time intervals (TTIs), where N is a positive integer.

In an embodiment, the storage medium of this embodiment may include, but is not limited to, a USB flash disk, a read-only memory (ROM), a random access memory (RAM), a mobile hard disk, a magnetic disk, an optical disk or another medium capable of storing program codes.

An embodiment of the present application further provides a processor. The processor is configured to execute programs which, when executed, execute the steps in the method according to any embodiment described above.

In this embodiment, the programs are used for executing a following step S1.

In step S1, it is indicated, in a preset manner, that a reference signal exists in at least one of N scheduled transmission time intervals (TTIs), where N is a positive integer.

In an embodiment, for specific examples in this embodiment, reference may be made to the examples described in the embodiments and application embodiments described above, and repetition will not be made in this embodiment.

Those skilled in the art should know that various modules or steps described above of the present application may be implemented by a universal computing device, the various modules or steps may be concentrated on a single computing device or distributed in a network composed of multiple computing devices. In an embodiment, the various modules or steps may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. In this way, the present application is not limited to any specific combination of hardware and software.

What is claimed is:

1. A method for determining a reference signal, comprising:
    determining, in a preset manner of a signaling indicating a reference signal pattern in each N short transmission time intervals (TTIs), that the reference signal exists in at least one of each N short TTIs in a semi-persistent scheduling (SPS) transmission, wherein a time domain position of the reference signal is unfixed in the short TTIs, and N is a positive integer,
    wherein when the signaling is physical layer signaling with different usages for SPS of different SPS transmission periods, the signaling is for indicating the reference signal pattern in each N short TTIs when an SPS transmission period is one short TTI, and all bits corresponding to the signaling are set to 0 for validation of an activation or a deactivation of the SPS transmission when an SPS transmission period is larger than one short TTI.

2. The method of claim 1, wherein a time domain position of the reference signal is fixed in the short TTIs, and the preset manner comprises at least one of:
    in a manner one, predefining that the reference signal exists in a first short TTI among each N short TTIs;
    in a manner two, indicating, via signaling, whether a reference signal density is reduced in the each N short TTIs, wherein not reducing the reference signal density means that all of the N short TTIs comprise reference signals, and reducing the reference signal density means that reference signals are comprised in short TTIs the number of which is less than N; or
    in a manner three, indicating, via signaling, a reference signal pattern in each N short TTIs.

3. The method of claim 2, wherein a short TTI where a first traffic transmission for activating the SPS transmission is performed comprises the reference signal.

4. The method of claim 2, wherein in the manner two, the reference signal density is reduced in at least one of the following manners:
   only the first short TTI comprises the reference signal;
   only the first short TTI and a last short TTI comprise reference signals; or
   only the first short TTI and a short TTI with an offset of x short TTIs from the first short TTI comprise reference signals, wherein x is an integer selected from a set [0, N].

5. The method of claim 4, wherein a short TTI where a first traffic transmission for activating the SPS transmission is performed comprises the reference signal.

6. The method of claim 1, wherein among each N short TTIs, the reference signal is comprised in a first orthogonal frequency division multiplexing (OFDM) symbol in a short TTI comprising the reference signal.

7. The method of claim 1, wherein a short TTI where a first traffic transmission for activating the SPS transmission is performed comprises the reference signal.

8. The method of claim 1, wherein the signaling has different meanings for an SPS period of one short TTI and for other periods, wherein the signaling is valid for the SPS period of one short TTI and is used for a reference signal indication in the each N short TTIs, and the signaling is used for a reference signal indication in a single short TTI for the other SPS periods.

9. The method of claim 1, wherein the method is applied to SPS with a period of one short TTI.

10. A non-transitory storage medium, comprising stored programs, wherein, when executed, the programs execute the method of claim 1.

11. A method for determining a control channel element (CCE), comprising:
   selecting part of N resource element groups (REGs) to constitute the CCE in at least one of the following manners:
   for a physical downlink control channel (PDCCH) based on a demodulation reference signal (DMRS), when a mapping between the CCE and the REGs is a distributed mapping, a following principle is at least satisfied:
      a group of M REGs at equal intervals or discrete intervals in a frequency domain constitute the CCE, wherein M is a number of REGs included in K resource blocks (RBs) in a transmission time interval (TTI), and K and N are both positive integers; or
   for a PDCCH based on a cell reference signal (CRS), when a mapping between the CCE and the REGs is a distributed mapping, a following principle is at least satisfied: in a single symbol, a group of REGs at equal intervals or discrete intervals in the frequency domain constitute the CCE,
   wherein when in the single symbol the group of REGs at equal intervals or discrete intervals in the frequency domain constitute the CCE used for a short PDCCH (sPDCCH), indexes of short REGs (sREGs) constituting a short CCE (sCCE) #n are determined in at least one of the following manners:

in a manner one, $$n \bmod \left\lfloor \frac{N_{sREG}^{symb}}{N_{sREG}^{sCCE}} \right\rfloor + \left\lfloor \frac{n}{\left\lfloor \frac{N_{sREG}^{symb}}{N_{sREG}^{sCCE}} \right\rfloor} \right\rfloor \cdot N_{sREG}^{symb} + i \cdot \left\lfloor \frac{N_{sREG}^{symb}}{N_{sREG}^{sCCE}} \right\rfloor; \text{ or}$$

in a manner two, $$n \bmod \left( \frac{N_{sREG}^{symb}}{N_{sREG}^{sCCE}} \right) + \left\lfloor \frac{n \cdot N_{sREG}^{sCCE}}{N_{sREG}^{symb}} \right\rfloor \cdot N_{sREG}^{symb} + i \cdot \left( \frac{N_{sREG}^{symb}}{N_{sREG}^{sCCE}} \right);$$

wherein n=0, . . . , $N_{sCCE,p}-1$, $N_{sCCE,p}$ denotes a number of sCCEs in a control channel RB set p, i=0, . . . , $N_{sREG}^{sCCE}-1$, $N_{sREG}^{sCCE}$ denotes a number of sREGs included in each sCCE, and $N_{sREG}^{symb}$ denotes a number of sREGs included in each orthogonal frequency division multiplexing (OFDM) symbol in the control channel RB set p.

12. The method of claim 11, further comprising:
   when the mapping between the CCE and the REGs is a centralized mapping, selecting a group of REGs continuous in the frequency domain in the single symbol to constitute the CCE, and indicating an aggregation level using an interleaving method or physical layer signaling, or differently scrambling different aggregation levels of information.

13. The method of claim 12, wherein the interleaving method comprises: sequentially writing indexes of REGs included in a candidate set with an aggregation level L into an interleaver and reading out the indexes from the interleaver according to a column permutation pattern, and deleting null elements, wherein a REG index greater than X is defined as a null element;
   wherein L=1, 2, 4 or 8; and
   X=L·M−1, wherein M denotes a number of REGs included in each CCE.

14. The method of claim 13, wherein the column permutation pattern comprises at least one of:
   <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>; or
   <0, 4, 8, 12, 16, 20, 24, 28, 1, 5, 9, 13, 17, 21, 25, 29, 2, 6, 10, 14, 18, 22, 26, 30, 3, 7, 11, 15, 19, 23, 27, 31>.

15. A non-transitory storage medium, comprising stored programs, wherein, when executed, the programs execute the method of claim 11.

16. A device for determining a reference signal, comprising a processor and a storage device, wherein the storage device stores processor-executable programs, and the programs comprise:
   a determining module, which is configured to determine, in a preset manner of a signaling indicating a reference signal pattern in each N short transmission time intervals (TTIs), that the reference signal exists in at least one of each N short TTIs in a semi-persistent scheduling (SPS) transmission, wherein a time domain position of the reference signal is unfixed in the short TTIs, and N is a positive integer,
   wherein when the signaling is physical layer signaling with different usages for SPS of different SPS transmission periods, the signaling is for indicating the reference signal pattern in each N short TTIs when an SPS transmission period is one short TTI, and all bits corresponding to the signaling are set to 0 for validation of an activation or a deactivation of the SPS transmission when an SPS transmission period is larger than one short TTI.

* * * * *